(12) United States Patent
Bevirt et al.

(10) Patent No.: US 8,096,026 B2
(45) Date of Patent: Jan. 17, 2012

(54) ACCESSORY CLIPS AND MOUNTING APPARATUS USING SAME

(75) Inventors: Joeben Bevirt, Santa Cruz, CA (US); Peter Frykman, Palos Verdes Peninsula, CA (US)

(73) Assignee: Joby Photo, Inc., San Francisco, CA (US)

( * ) Notice: Subject to any disclaimer, the term of this patent is extended or adjusted under 35 U.S.C. 154(b) by 727 days.

(21) Appl. No.: 11/637,611

(22) Filed: Dec. 12, 2006

(65) Prior Publication Data

US 2008/0035807 A1    Feb. 14, 2008

Related U.S. Application Data

(63) Continuation-in-part of application No. 11/324,994, filed on Jan. 3, 2006.

(51) Int. Cl.
*F16L 3/00* (2006.01)

(52) U.S. Cl. .... 24/335; 248/74.3; 248/314; 248/225.11; 248/73; 24/910; 24/337; 24/370; 24/336

(58) Field of Classification Search .................. None
See application file for complete search history.

(56) References Cited

U.S. PATENT DOCUMENTS

| | | | | |
|---|---|---|---|---|
| 2,559,464 | A | * | 7/1951 | Roberg ............................ 217/36 |
| 3,807,675 | A | * | 4/1974 | Seckerson et al. .............. 248/73 |
| 4,250,601 | A | * | 2/1981 | Ward .............................. 24/570 |

* cited by examiner

*Primary Examiner* — Jack W. Lavinder
(74) *Attorney, Agent, or Firm* — Michael A. Guth

(57) ABSTRACT

The present invention is directed to mounting clips and structures to support the mounting clips. One such clip is substantially annular in nature. The mounting clip may have internal grip strips within its interior to better enable the clip to engage the supported item. Other clips involve the use of a suction cup and other designs. The mounting clips may be used with a tripod or a monopod, and in some embodiments a tripod with flexible legs utilizing ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors. In some embodiments, the ball and socket joint connectors utilize an over-molded strip around the outside of the connector to facilitate in their use for gripping.

12 Claims, 34 Drawing Sheets

SECTION A-A

ACCESSORY CLIPS AND MOUNTING APPARATUS USING SAME

CROSS-REFERENCE TO RELATED APPLICATIONS

This application is a continuation in part of U.S. patent application Ser. No. 11/324,994 to Bevirt, filed Jan. 3, 2006, which is hereby incorporated by reference in its entirety.

BACKGROUND

1. Field of the Invention

The present invention relates to device mounting, and more specifically to mounting clips that may be used to mount various items to a tripod or other apparatus.

2. Description of Related Art

Mounting devices may come in a variety of forms. Some mounting devices are used to mount various types of hardware to a variety of types of structure. Tripod structures may be used to mount devices.

Typical tripod assemblies consist of three rigid legs which are splayed out to form a support structure for devices such as cameras. The legs are usually rigid and adapted to provide support off of the ground or other flat surface. Some tripods have some adjustment to leg length which may allow for some deviation from flatness in the surface upon which they are mounted. Such tripods are limited in the manner in which they support devices. In addition, new mounting clips are needed to meet the need for mounting a variety of devices.

What is called for is a mounting apparatus that may function as a tripod and also as a grip mount for the mounting to vertical members. What is also called for is a clip that can be used to mount cylindrical objects. What is also called for are accessory clips for mounting of different items to tripods and monopods.

SUMMARY

The present invention is directed to mounting clips and structures to support the mounting clips. One such clip is substantially annular in nature. The mounting clip may have internal grip strips within its interior to better enable the clip to engage the supported item. Other clips involve the use of a suction cup and other designs.

The mounting clips may be used with a tripod or a monopod, and in some embodiments a tripod with flexible legs utilizing ball and socket joint connectors which, when interconnected, form a flexible assembly. Each connector includes a body with a first and second end portion. An external socket engaging surface is provided at one end of the body. The other end of the body has an internal cavity. The socket engaging surface of one connector is snapped into the internal cavity of another to interconnect the connectors. In some embodiments, the ball and socket joint connectors utilize an overmolded strip around the outside of the connector to facilitate in their use for gripping.

DETAILED DESCRIPTION

Figure 1:
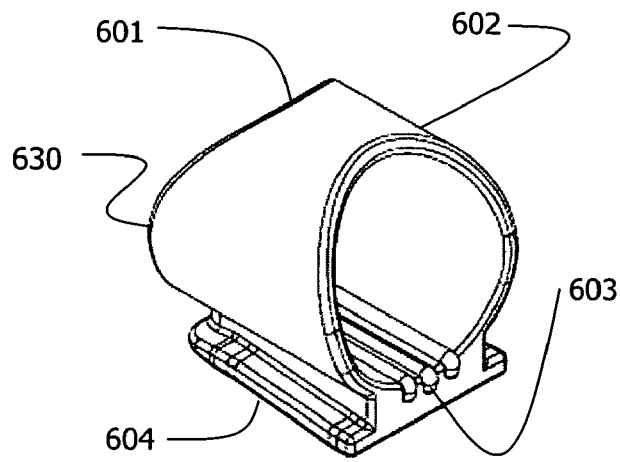
FIG. 1 illustrates an annular clip according to some embodiments of the present invention.

FIG. 1 illustrates a clip 601 according to some embodiments of the present invention. The clip has a main body 602 which includes an annular ring 630. The clip 601 has a clip base 604 adapted to be clipped into a mating support structure. The clip base 604 is located on the external periphery of the annular ring 630 of the main body 602. The main body may be made from an acetyl material in some embodiments. In some embodiments, the annular ring 630 is completely circumferential. In some embodiments, the annular ring may be partially circumferential.

One or more grip strips 603 are located along the inside surface of the annular ring. The grip strips 603 are of a softer compound than the main body and are adapted to compress when an item is inserted into the annular ring 630. The grips strips provide a frictional fit for an item that is somewhat smaller in external diameter than the internal diameter of the ring. In some embodiments, the grips strips are a rubberized compound. The grips strips may be overmolded onto the main body, which itself may be a molded product. In some embodiments, the grips strips are substantially parallel to principal axis of the cylinder inscribed by the annulus of the main body.

Figure 2:
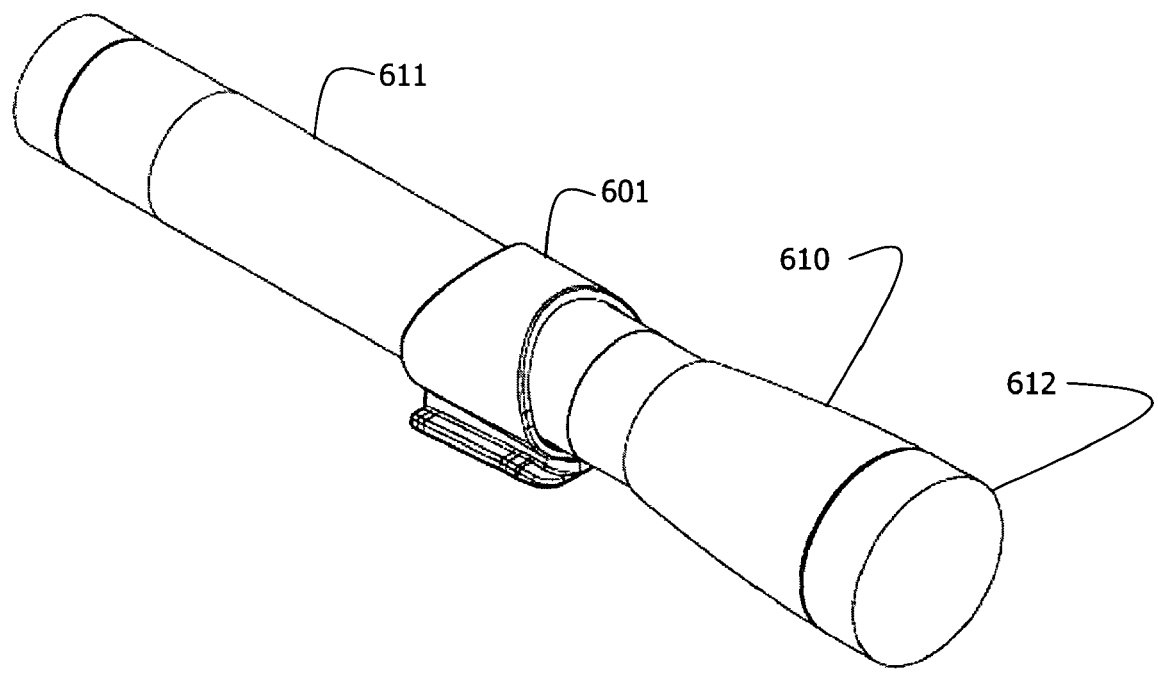
FIG. 2 illustrates an annular clip with a flashlight therein according to some embodiments of the present invention.

FIG. 2 illustrates a flashlight 610 inserted into a clip 601. The cylindrical portion 611 of the flashlight has been inserted into the clip 601. The light 612 will shine in the direction selected by the user once the clip 601 has been placed in a supporting structure, such as a tripod. The flashlight 610 is held in place within the annulus of the clip 601 with the grip strips which have been compressed by the insertion of the flashlight. The grips strips provide sufficient friction to keep the flashlight in place. Although shown here in use with a flashlight, other objects may be held within the clip 601.

Figure 3:
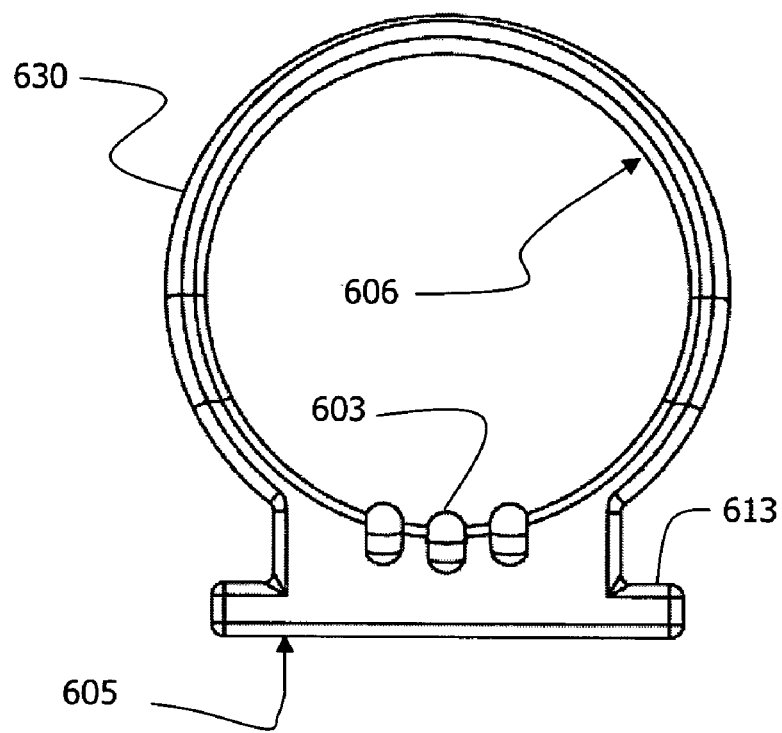
FIG. 3 is a front view of an annular clip according to some embodiments of the present invention.
Figure 4:
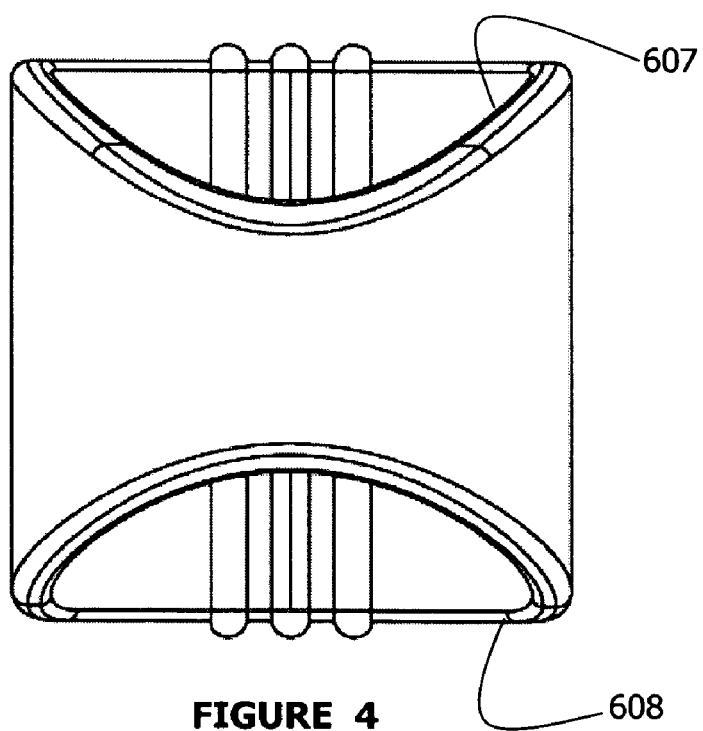
FIG. 4 is a top view of an annular clip according to some embodiments of the present invention.

FIGS. 3 and 4 are a front view and a top view, respectively, of a clip 601 according to some embodiments of the present invention. The interior surface 606 of the annular ring 630 is seen and is substantially circular in aspect. The grips strips 603 are substantially parallel to the axis of the cylinder of the annulus. The grip strips may be molded into slots which were in the interior surface of the annulus. The clip interface portion may have a flat bottom surface 605 and rails 613 along its sides, or along three sides. The rails 613 allow for the clip to be inserted into a mating interface which is adapted to receive a flat bottomed clip and which has grooves along its sides to receive the rails of the clip. A front opening 607 and a back opening 608 allow for the through passage of an item such as a flashlight through the clip to a point where it is perhaps more balanced, and therefore more stable when held in a support structure, such as a tripod. The grip strips are adapted to retain the item in position after it is pushed by the user to the desired position.

Figure 5:
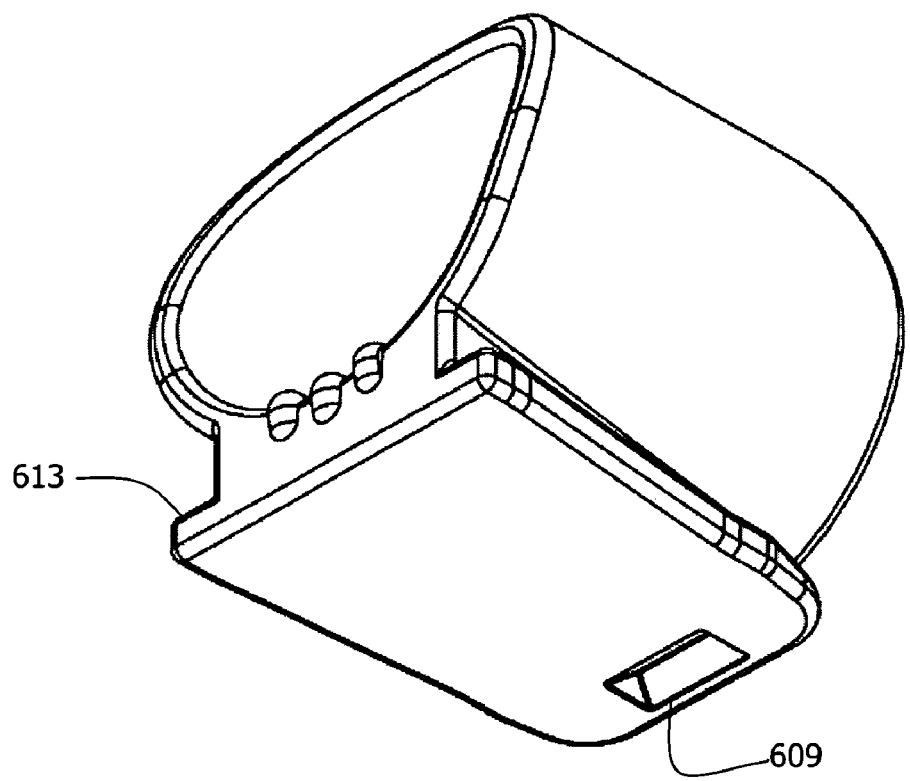
FIG. 5 is a bottom perspective view of a clip according to some embodiments of the present invention.
Figure 6:
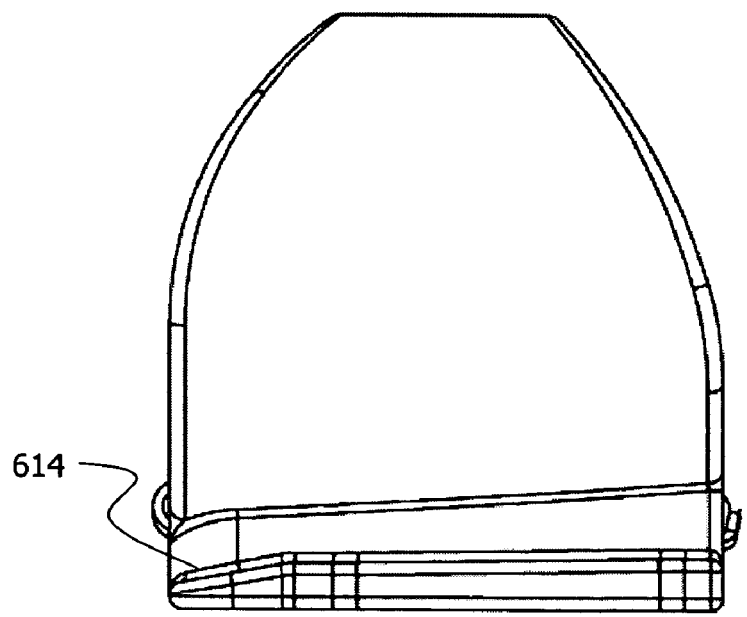
FIG. 6 is a side view of a clip according to some embodiments of the present invention.

FIGS. 5 and 6 are a bottom perspective view and a side view of a clip, respectively, according to some embodiments of the present invention. A slot 609 is seen in the bottom of the planar plate of the clip interface portion. The slot 609 is adapted to allow for the capture of the clip by a tab when slid into an interfacing portion of a support structure, such as may used with a tripod. A neckdown 614 on the rail allows for easier insertion of the clip into its interfacing connector.

Figure 7:
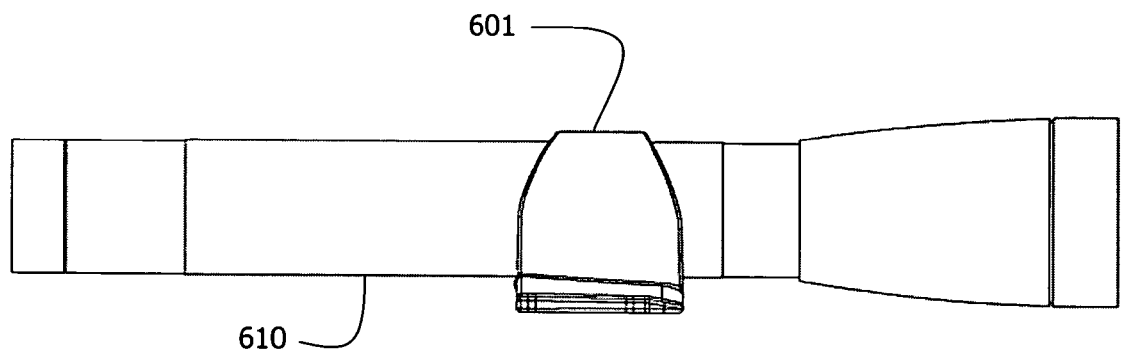
FIG. 7 is a side view of an annular clip with a flashlight therein according to some embodiments of the present invention.
Figure 8:
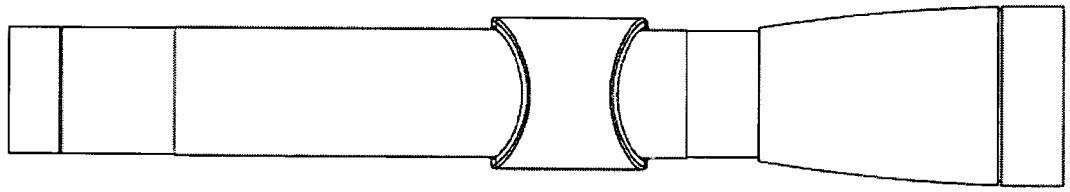
FIG. 8 is a top view of an annular clip with a flashlight therein according to some embodiments of the present invention.

FIGS. 7 and 8 illustrate a flashlight 610 inserted into a clip 601 according to some embodiments of the present invention. The flashlight may be inserted to a point where the mass is relatively balance between the front and back of the clip. Once the user has inserted the flashlight to a chosen depth of insertion, the grip strips will hold the flashlight in this location.

Figure 9:
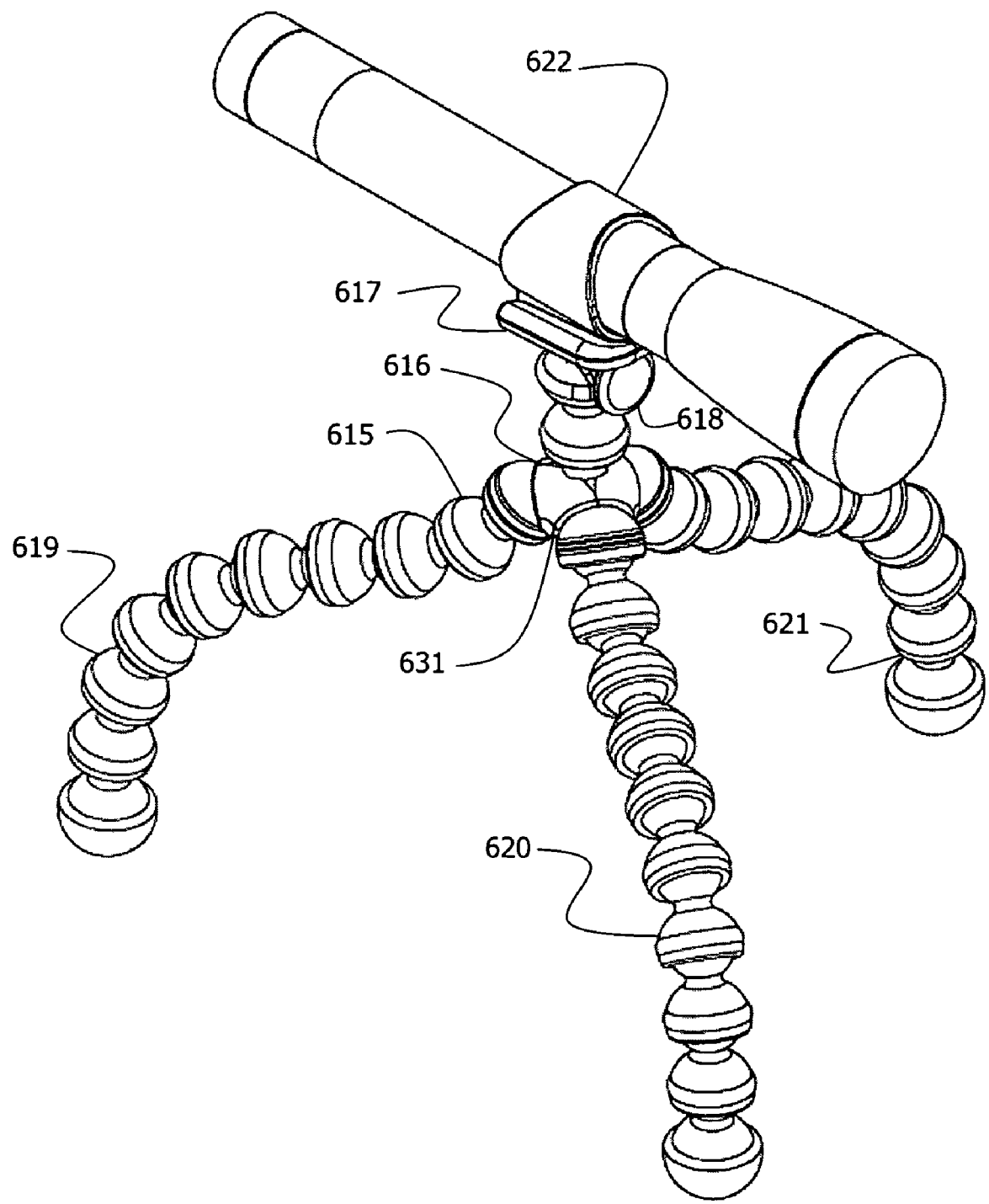
FIG. 9 is a view of a tripod and an annular clip with a flashlight according to some embodiments of the present invention.
Figure 10:
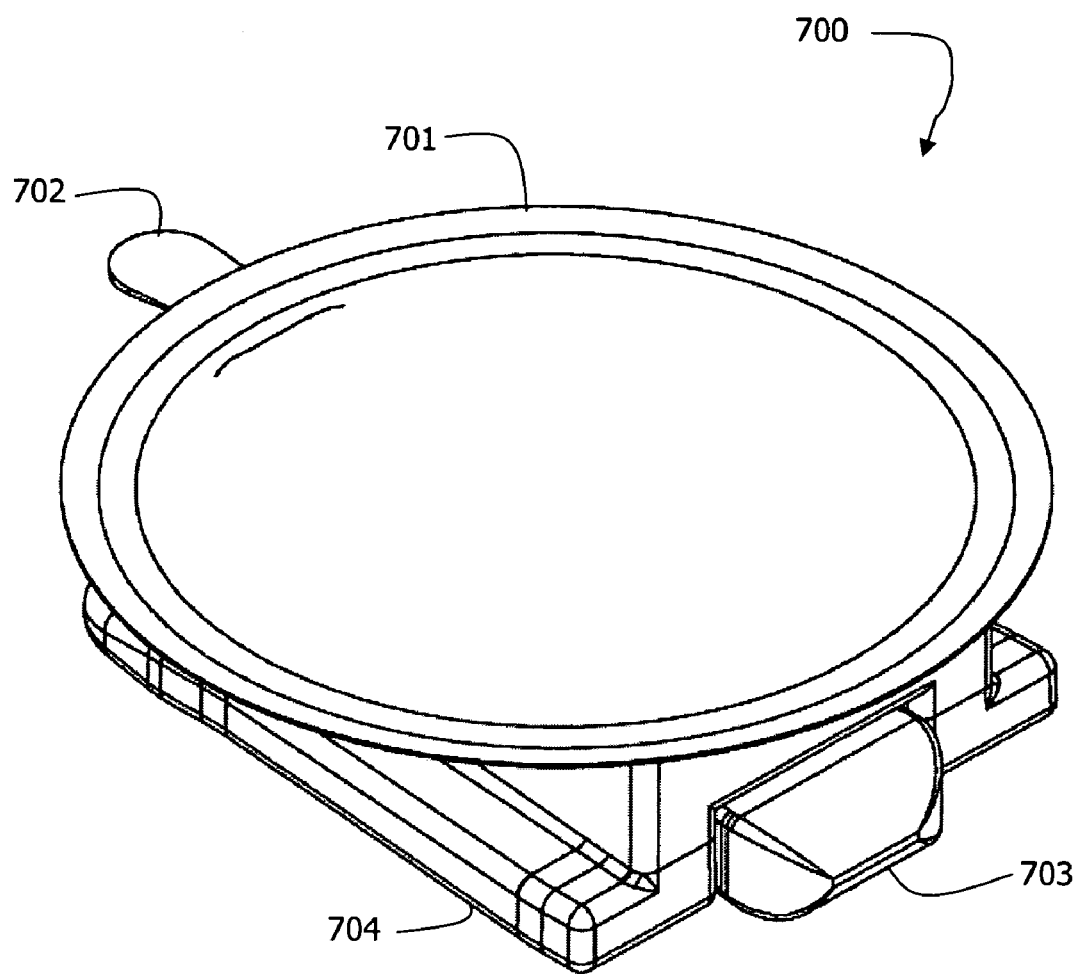
FIG. 10 is a perspective view of a suction clip according to some embodiments of the present invention.
Figure 11:
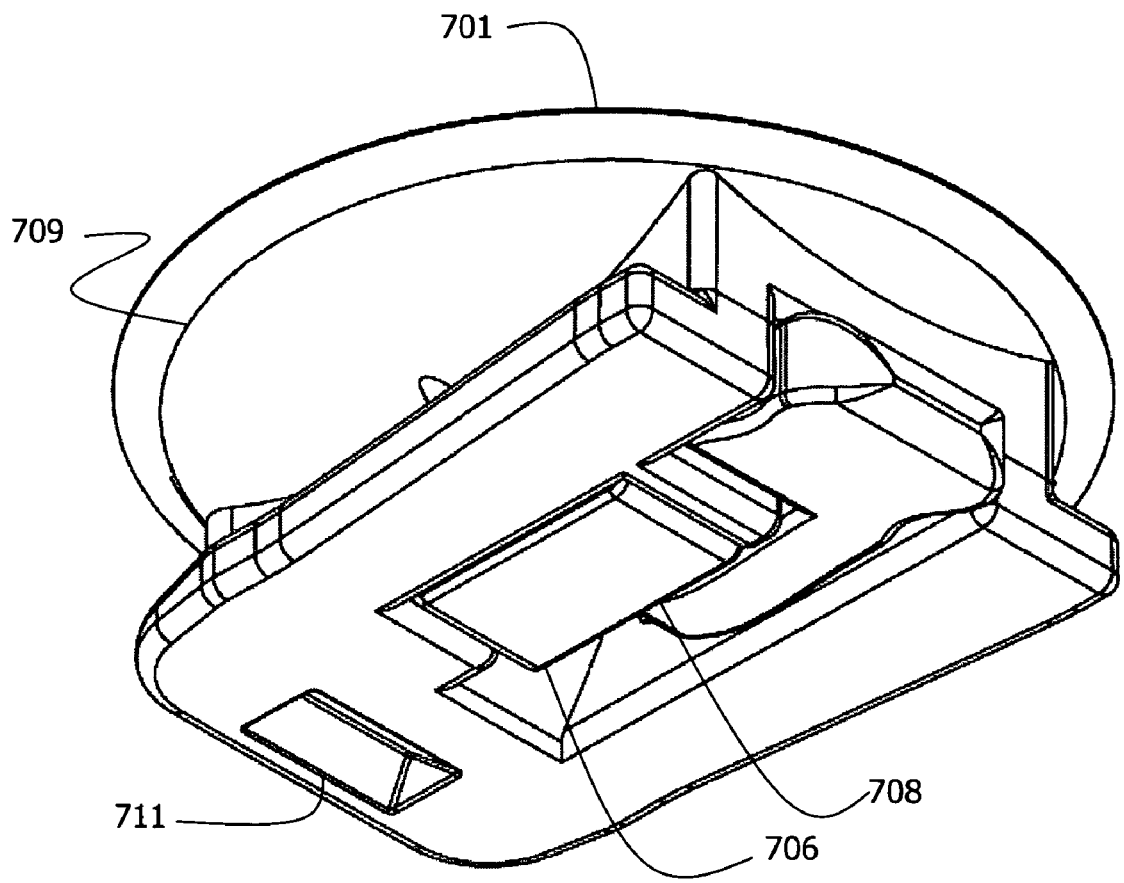
FIG. 11 is a perspective view of a suction clip according to some embodiments of the present invention.
Figure 12:
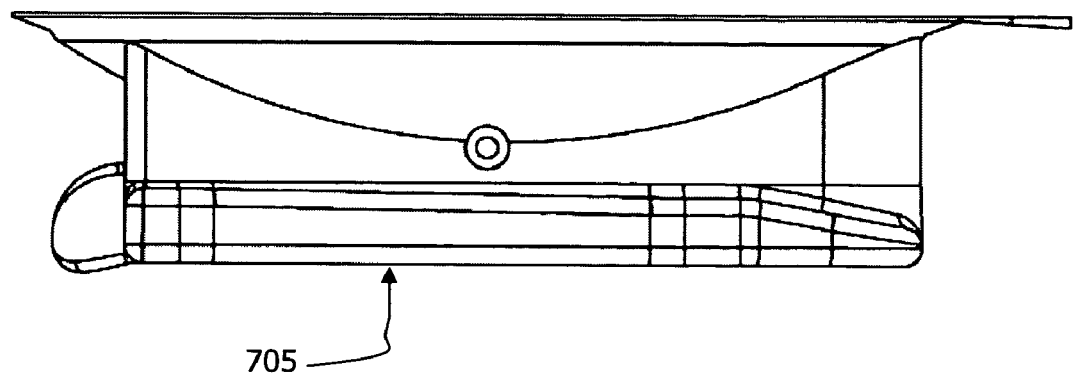
FIG. 12 is a side view of a suction clip according to some embodiments of the present invention.
Figure 13:
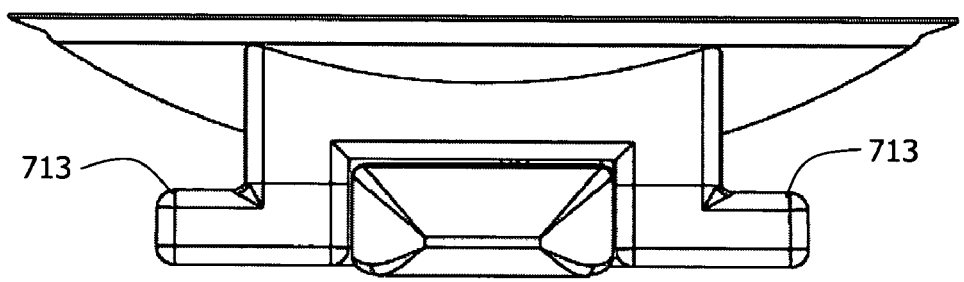
FIG. 13 is a rear view of a suction clip according to some embodiments of the present invention.
Figure 14:
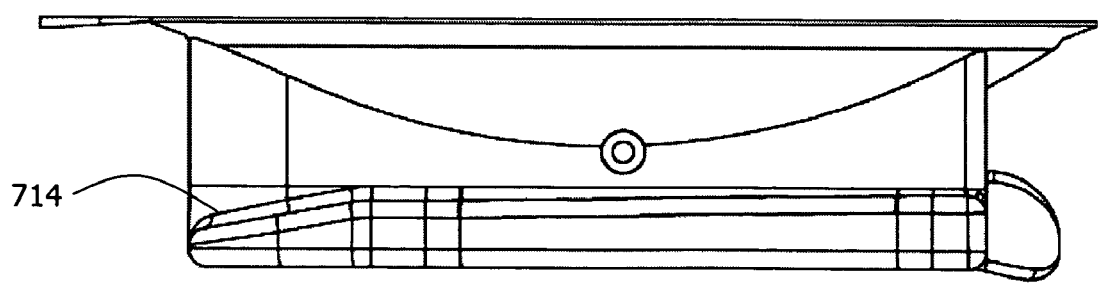
FIG. 14 is a side view of a suction clip according to some embodiments of the present invention.
Figure 15:
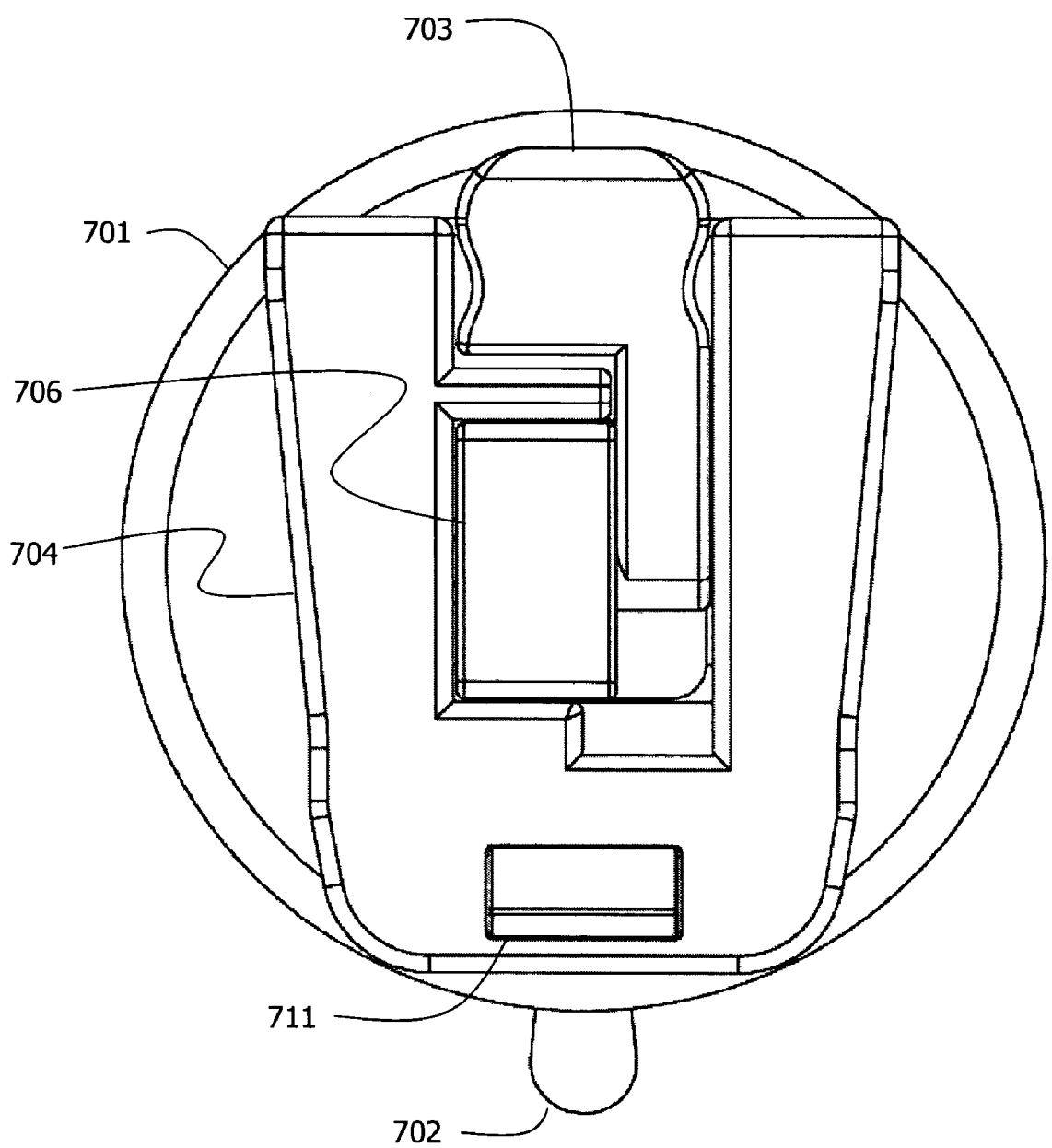
FIG. 15 is a bottom view of a suction clip according to some embodiments of the present invention.
Figure 16:
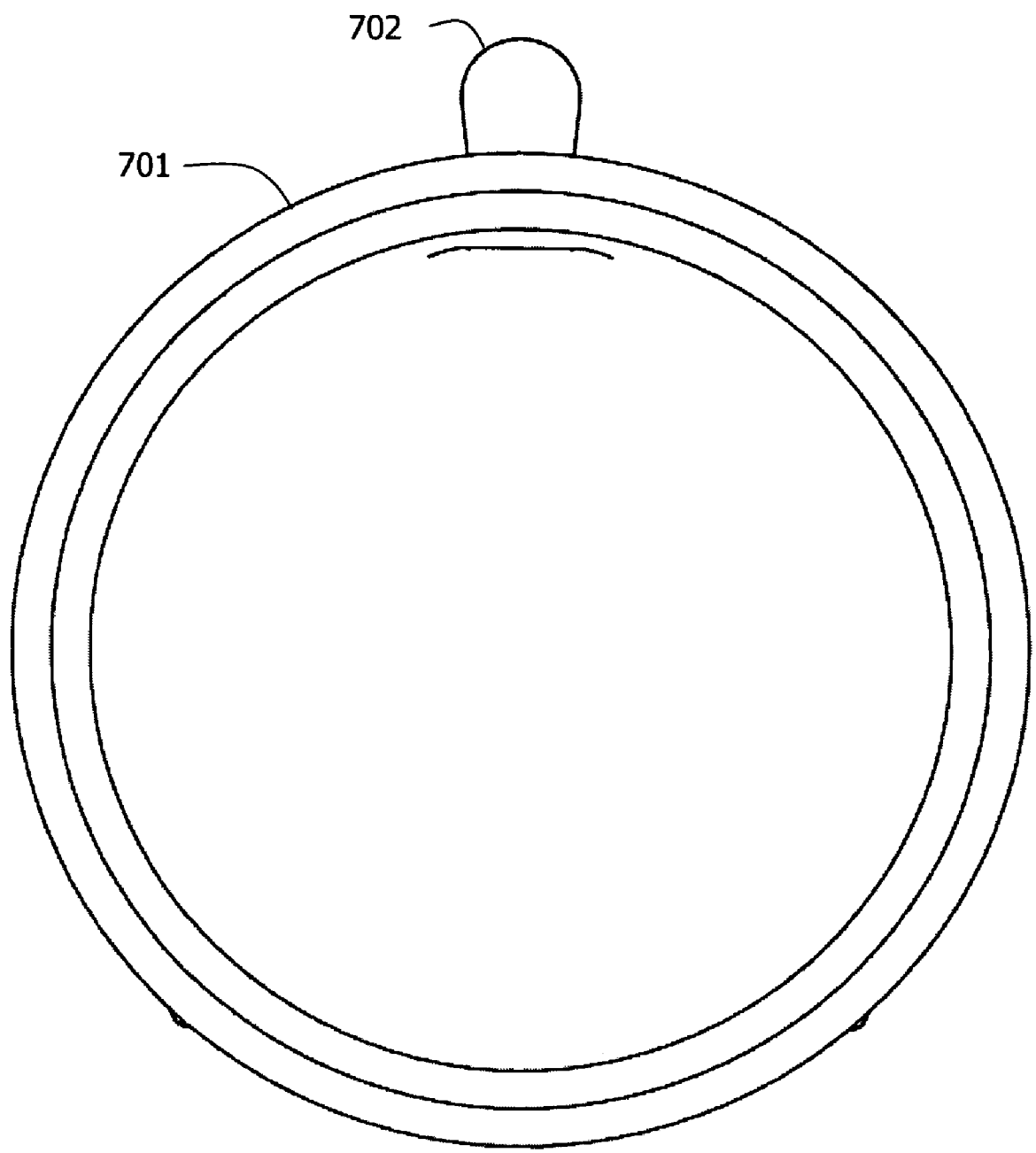
FIG. 16 is a top view of a suction clip according to some embodiments of the present invention.
Figure 17:
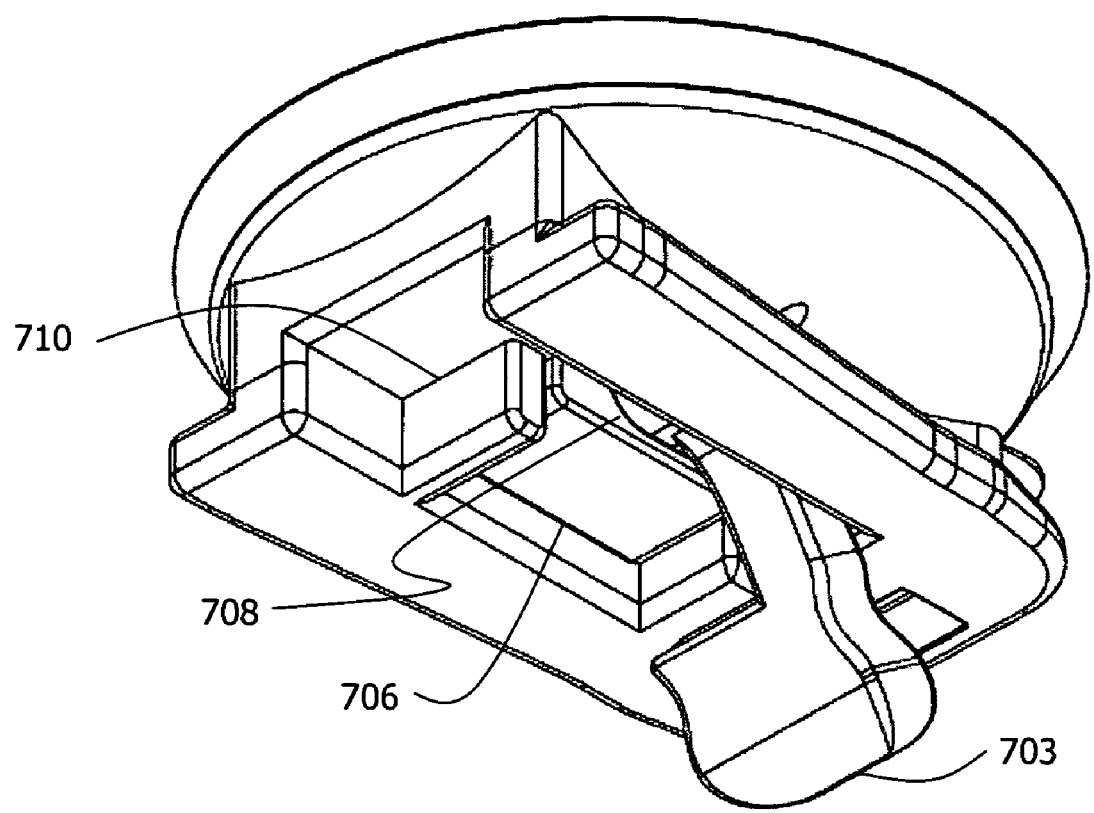
FIG. 17 is a perspective view of a suction clip in the open position according to some embodiments of the present invention.

FIG. 9 is a sketch of a tripod and a flashlight inserted into a clip. The flashlight and clip assembly 622 are seen attached to a tripod 631. The flashlight and clip assembly 622 is adapted to be attached into the tripod's interconnect portion 617. A release lever 618 allows for the release of the clip from the interconnect portion of the tripod. The release lever may release a tab that catches within the slot 609 on the bottom of the clip. The main body 616 of the tripod is seen with three flexible legs 619, 620, 621 according to some embodiments of the present invention. The flexible nature of the legs allow the tripod to also be used for gripping to vertical members by wrapping around them.

FIGS. 10-16 illustrate a suction clip 700 in a closed position according to some embodiments of the present invention. The suction clip 700 is adapted to be removably attached to a support structure such as a tripod or a unipod. A suction cup 701 is attached to and overlays the clip base 704. A release lever 703 is seen embedded within the clip base 704. A release tab 702 is attached to the suction cup 701. The clip base 704 is of a relatively rigid material such as a plastic or acetyl. The suction cup is of a more compliant material such as rubber or rubberized compound.

The suction clip 700 has a clip base 704 adapted to be clipped into a mating support structure. The clip base may have a flat bottom surface 705 and rails 713 along its sides, or along three sides. The rails 713 allow for the clip to be inserted into a mating interface which is adapted to receive a flat bottomed clip and which has grooves along its sides to receive the rails of the clip. A slot 711 is seen in the bottom surface 705 of the planar bottom of the clip base 704. The slot 711 is adapted to allow for the capture of the clip by a tab when slid into an interfacing portion of a support structure, such as a tripod. A neckdown 714 on the rail allows for easier insertion of the clip into its interfacing connector.

The suction clip may be used with a support structure as a removably attached clip. The removable aspect of the clip allows the support structure to be used with different types of clips when desired by the user. In addition, the user may want to attach the clip to the device and remove the device with the clip attached from the support structure.

Figure 22:
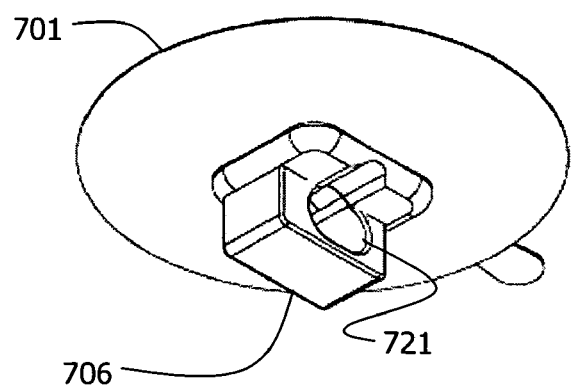
FIG. 22 is a perspective view of a suction cup according to some embodiments of the present invention.

A cup bowl 709 forms the upper part of clip base 704. The cup bowl 709 provides a bowl shaped support for the suction cup 701. Along the underside of the clip base 704 is a mechanism for providing suction, via the suction cup 701, to a surface of an item to be adhered to the suction clip 700. The release lever 703 is hinged to the suction cup base 706 around a hinge line 708. The release lever 703 is hinged to the clip base 704 with a hinge pin 707. The suction cup base is attached to the suction cup 701. In some embodiments, the suction cup base 706 is co-molded to the suction cup 701. FIG. 22 illustrates a suction cup assembly with the suction cup 701 co-molded to the suction cup base 706. The suction cup base may be of a relatively rigid material such as an acetyl, and the suction cup may be of a more ductile, rubberized material.

Figure 18:
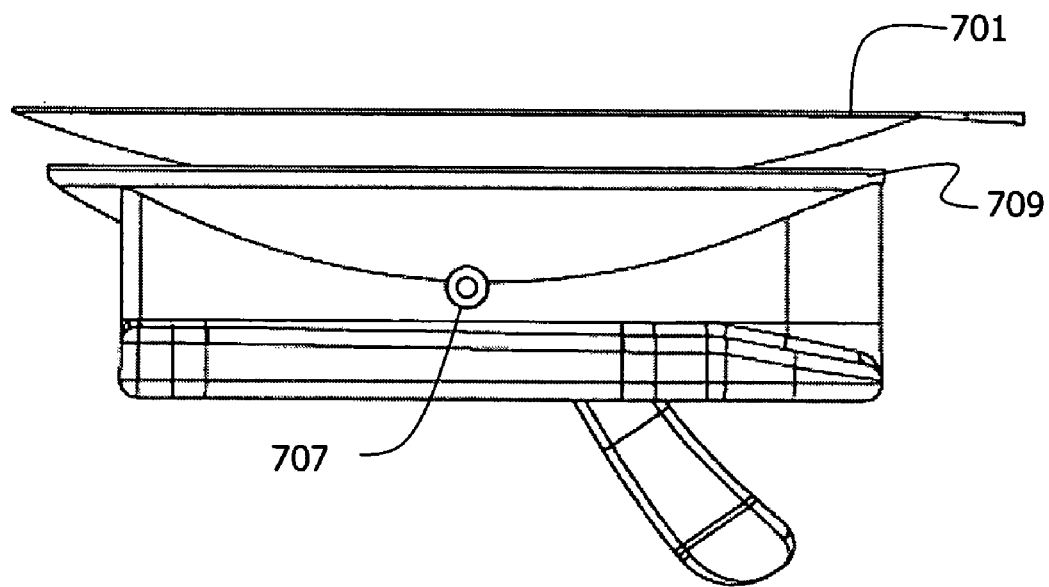
FIG. 18 is a side view of a suction clip in the open position according to some embodiments of the present invention.
Figure 19:
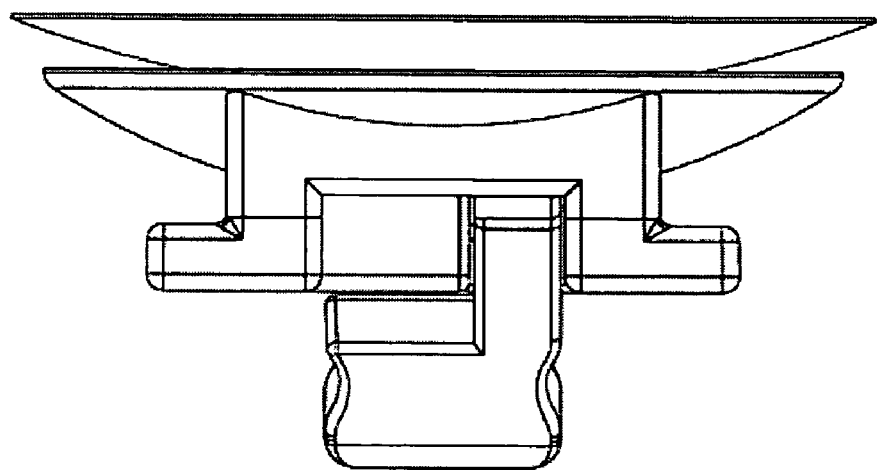
FIG. 19 is a rear view of a suction clip in the open position according to some embodiments of the present invention.
Figure 20:
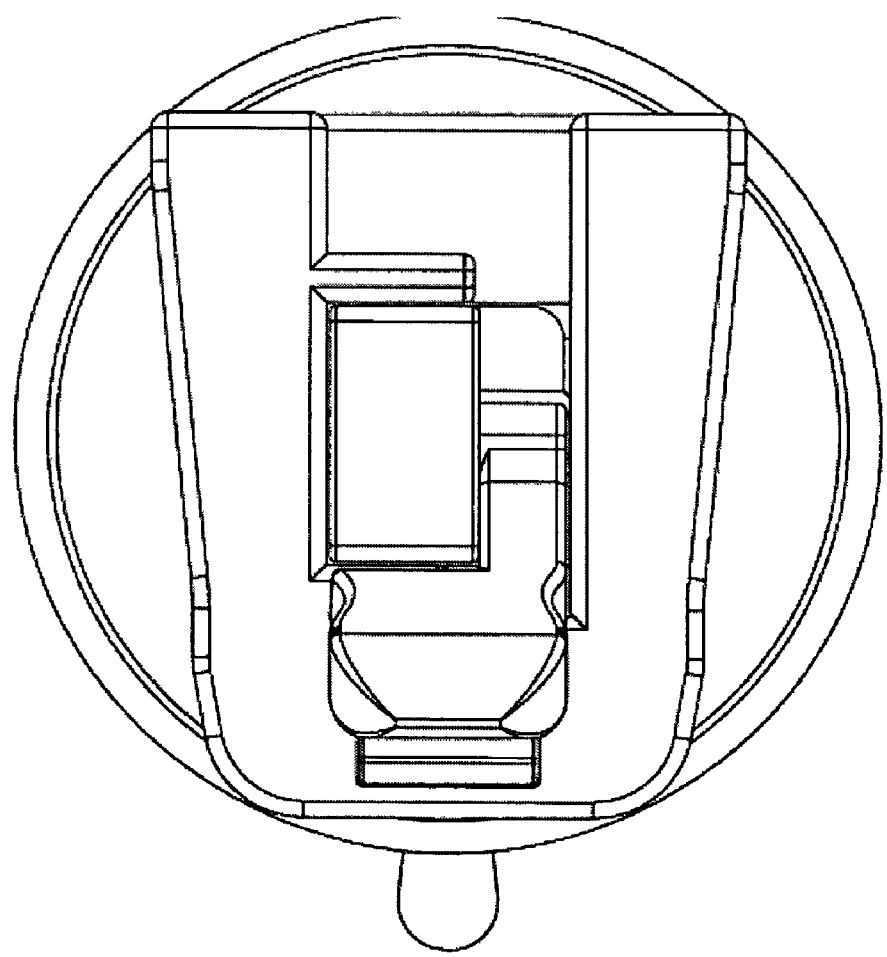
FIG. 20 is a bottom view of a suction clip in the open position according to some embodiments of the present invention.
Figure 21:
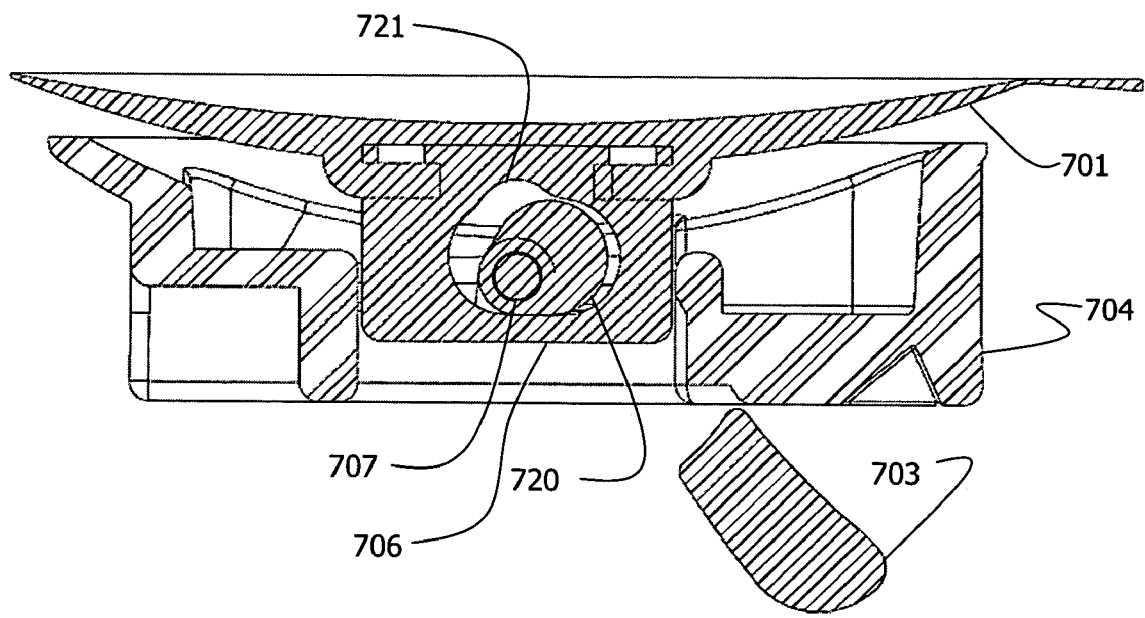
FIG. 21 is a cross-sectional view of a suction clip according to some embodiments of the present invention.

FIGS. 17-20 illustrate the suction clip 700 in an open position. A mechanism for applying suction via the suction cup to the item to be attached resides within the suction cup base 706. The release lever 703 has been rotated from a first closed position in plane with the bottom surface of the clip base to a second position. The rotation occurs around a hinge line 708. The rotation of the release lever 703 moves the suction cup base 706 upwards away from the bottom surface 705 of the clip base. As seen in FIG. 18, the suction cup 701 may also raise off of the suction cup bowl 709 with the raising of the suction cup base 706.

The release lever 703 has a cam 720 which fits within an opening 721 in the suction cup base 706. The movement of the release lever 703 raises or lowers the suction cup base 706 working with a cam motion. The cam 720 is rotationally fixed to the release lever 703. In some embodiments, the are a single piece. The pin is held in place in holes in the suction cup base 704.

The item to be adhered to the suction clip is placed on the suction cup while the release lever 703 is in the open position. Preferably a smooth planar portion of the item to be adhered is in contact with the suction cup. The outer periphery of the suction cup makes a seal on the item to be adhered to. The release lever is then moved from the second open position to the first, closed position. This motion of the release lever pulls the bottom of the suction cup down and away from the item to be adhered to. The bottom of the suction cup is pulled by the leveraged motion of the suction cup base, which is pivotally attached to the release lever. The pulling down of the suction cup base imparts lower or negative pressure to the area between the suction cup and the item, adhering the item to the suction clip. The suction cup base is pulled down through a guide hole through which the suction cup base may travel vertically. The suction cup bowl holds up the suction cup near its outer periphery but does not impede the pulling down of the central area of the suction cup. After release of the negative pressure, the item that had been adhered to by the suction cup can be helped to be released from the suction cup by the pulling of the pull tab 702.

As the case with other clips described herein, the use of a clip that can be fastened to an item, such as a cell phone, flashlight, flash, camera, etc., separate from attachment to the support structure provides greater ease and more versatility for the user.

Figure 23:
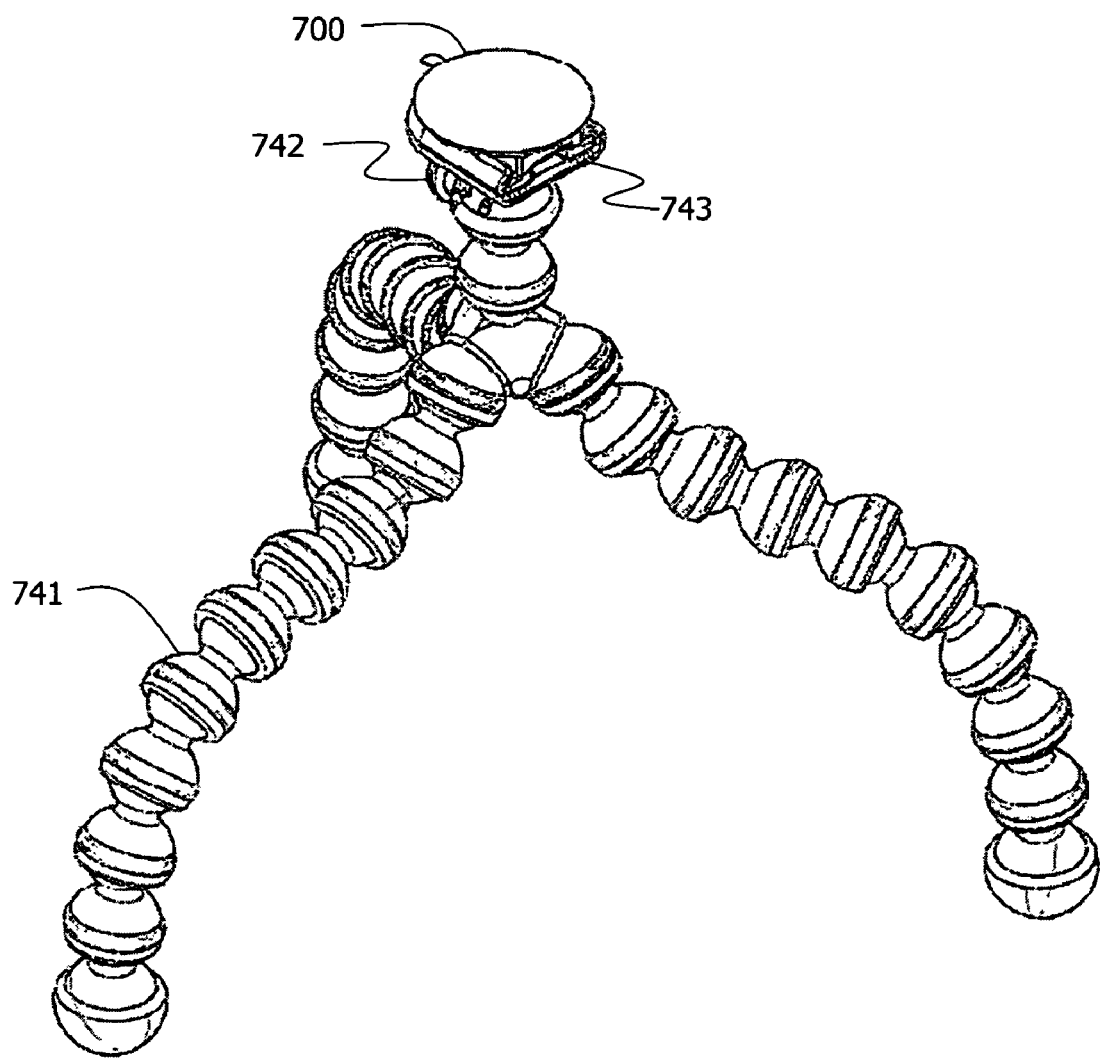
FIG. 23 is a perspective view of a tripod and a suction clip according to some embodiments of the present invention.
Figure 24:
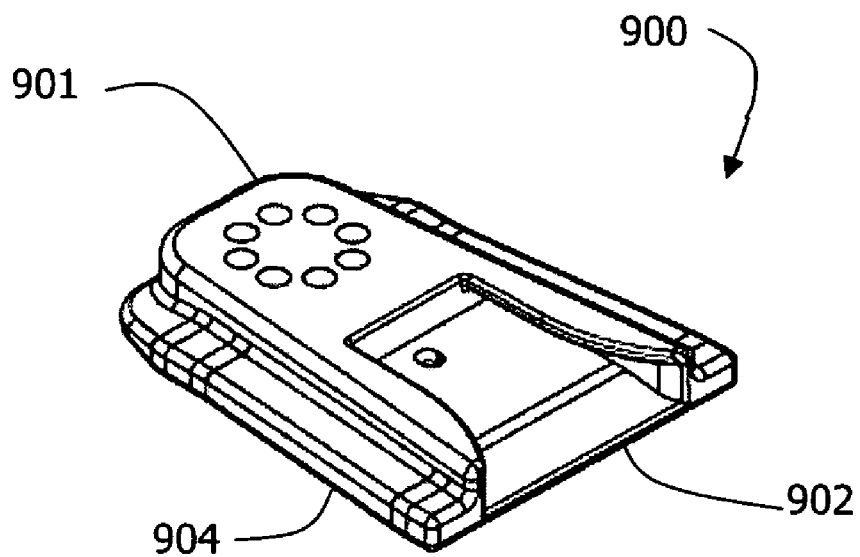
FIG. 24 is a top perspective view of a flash clip according to some embodiments of the present invention.
Figure 25:
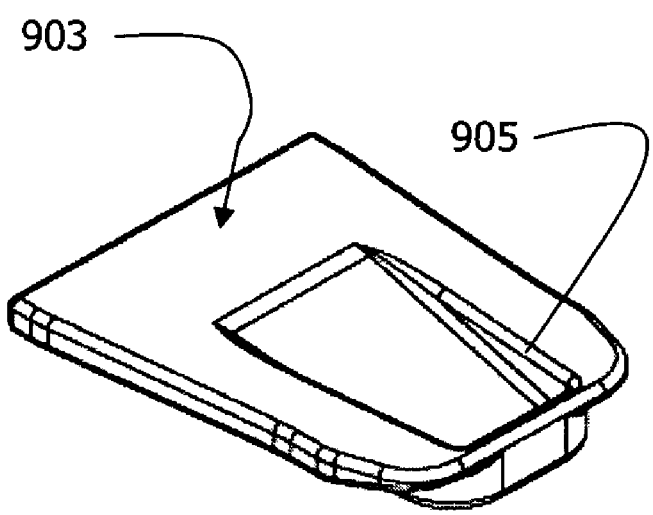
FIG. 25 is a bottom perspective view of a flash clip according to some embodiments of the present invention.
Figure 26:
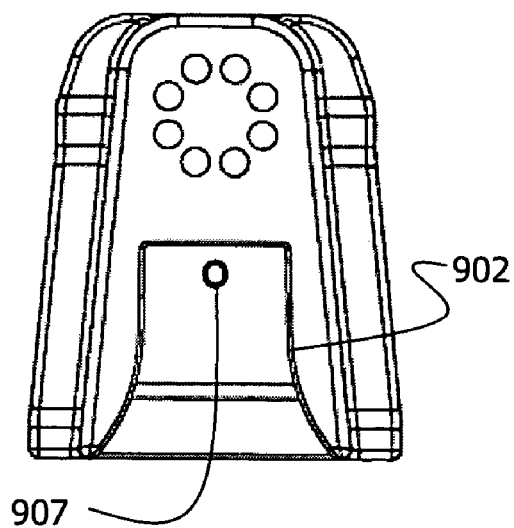
FIG. 26 is a top view of a flash clip according to some embodiments of the present invention.
Figure 27:
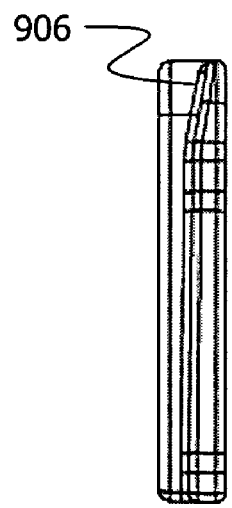
FIG. 27 is a side view of a flash clip according to some embodiments of the present invention.
Figure 28:
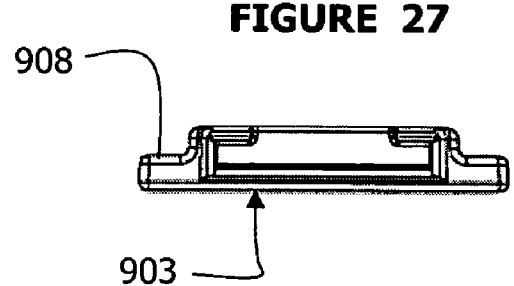
FIG. 28 is a rear view of a flash clip according to some embodiments of the present invention.

FIG. 23 is a sketch of a suction clip 700 attached to a tripod 741 according to some embodiments of the present invention. The clip base has been inserted into the interface portion 743 of the tripod. A release button 742 is adapted to allow for the easy removal of the suction clip 700. The release button 742 releases a tab that was in a slot on the bottom surface of the clip base.

FIGS. 24-28 illustrate a flash clip 900 according to some embodiments of the present invention. The flash clip 900 is adapted to attach to a modern flash unit interface, and then be clipped into a support structure such as a tripod. The clip base may have a flat bottom surface 903 and rails 708 along its sides, or along three sides. The rails 708 allow for the clip to be inserted into a mating interface which is adapted to receive a flat bottomed clip and which has grooves along its sides to receive the rails of the clip. A slot 905 is seen in the bottom surface 903 of the planar bottom of the clip base 901. The slot 905 is adapted to allow for the capture of the clip by a tab when slid into an interfacing portion of a support structure, such as a tripod. A neckdown 906 on the rail allows for easier insertion of the clip into its interfacing connector.

An opening 902 is adapted to receive a modern flash unit. The mating structure of the flash unit slips into the opening 902 which has interior slots along its three sides. A hole 907 is adapted to receive a pin that extends from the flash unit. The flash unit may be a remotely fired unit such that the tripod, or other support unit, in which the flash and clip are mounted may be place in a position away from the camera. The clip allows mating of the flash to the clip in advance, and with ease, so that the clip/flash combo may be easily inserted into and removed from the support structure when desired.

Figure 29:
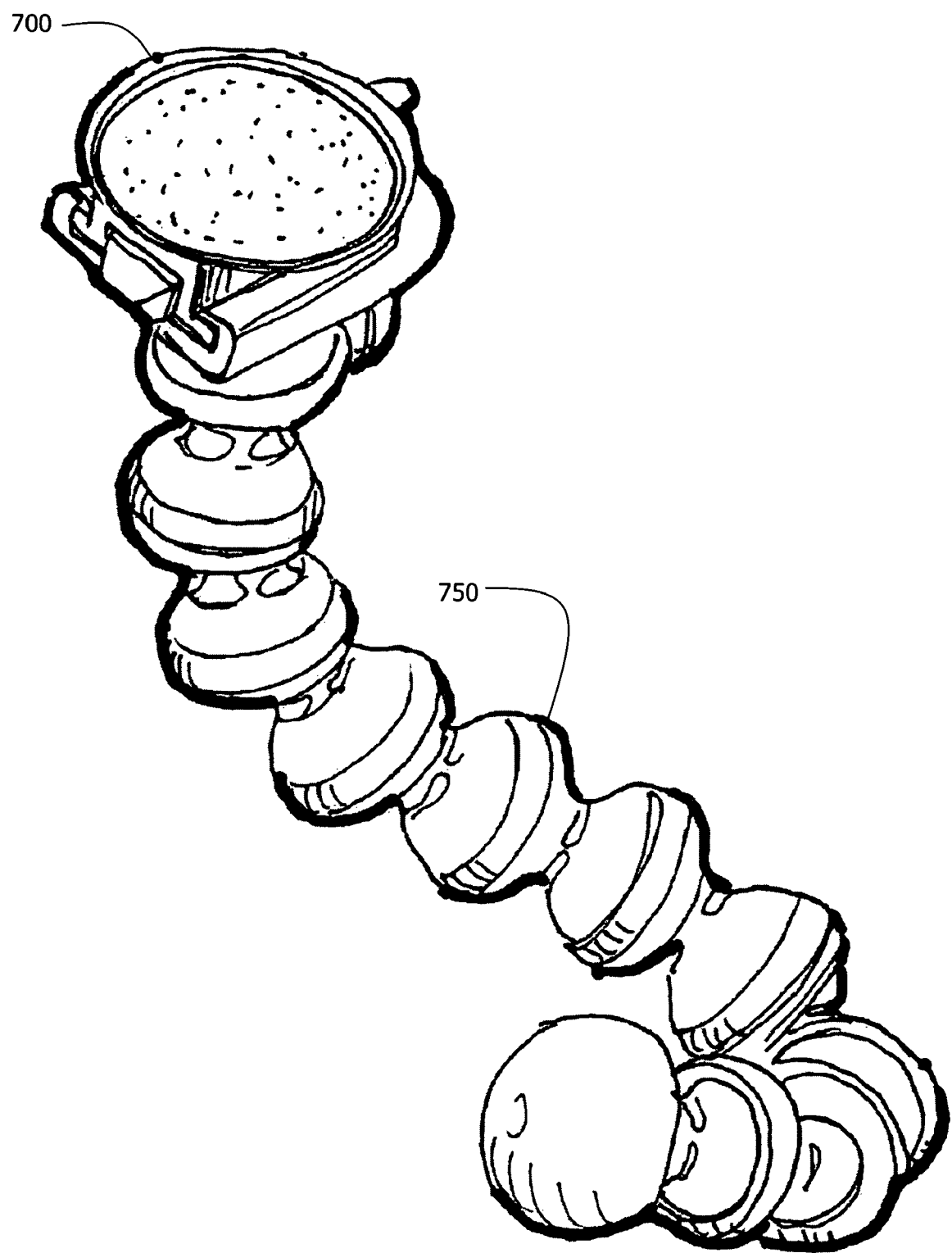
FIG. 29 is a sketch of a unipod with a suction clip according to some embodiments of the present invention.
Figure 30:
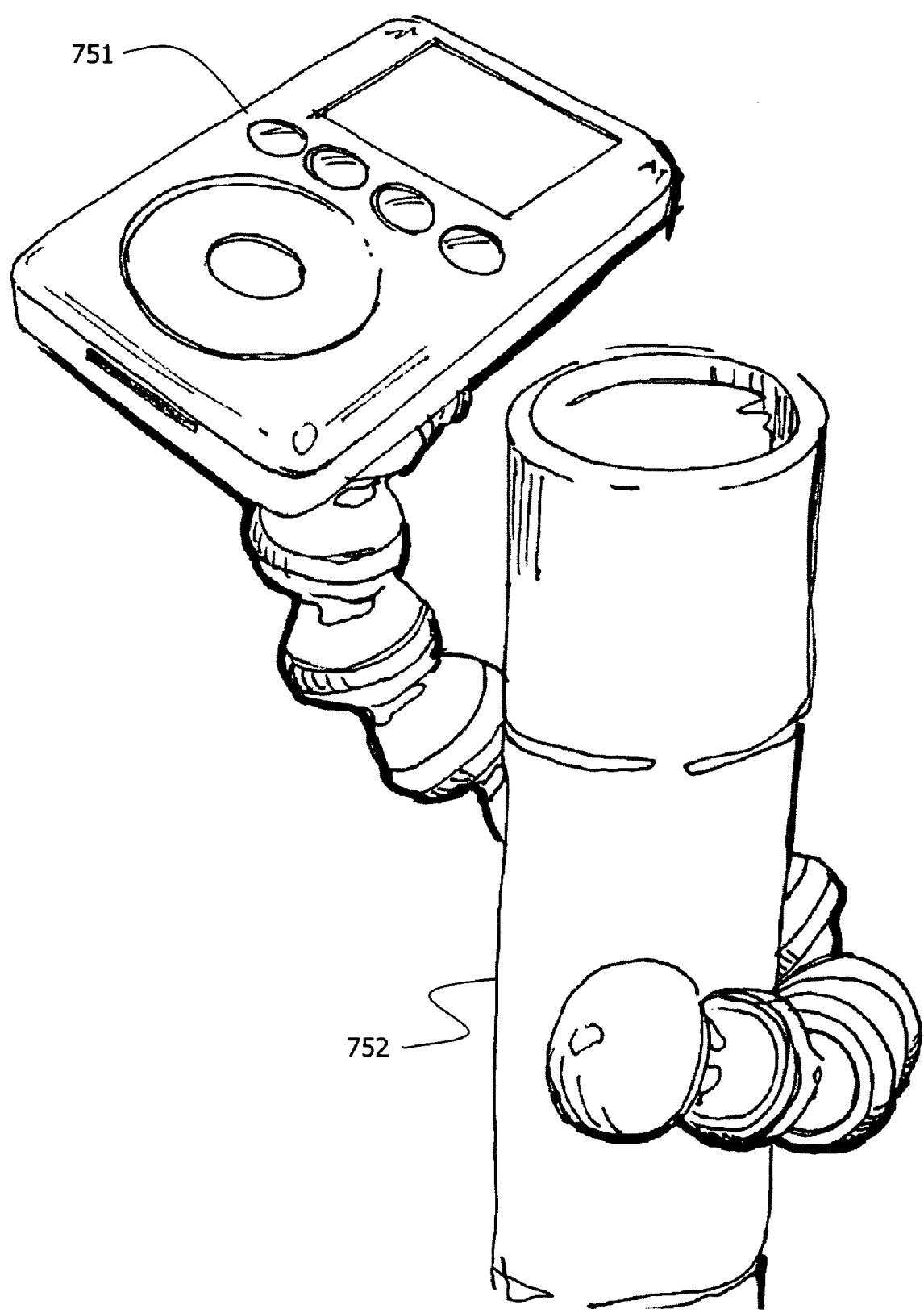
FIG. 30 is a sketch of a unipod with an electronic device mounted on it according to some embodiments of the present invention.

FIGS. 29 and 30 illustrate a monopod, or unipod, with removably attached clips according to some embodiments of the present invention. A monopod 750 is seen with a series of ball and socket connectors with an overmolded grip strip as seen in other embodiments of the present invention. The monopod 750 may have an interface portion which is adapted to receive clips according to embodiments of the present invention. The monopod 750 allows for mounting to members, such as a vertical member 752. An electronic item 751, or other item, may be attached to a mounting clip and supported by the support structure.

Figure 31:
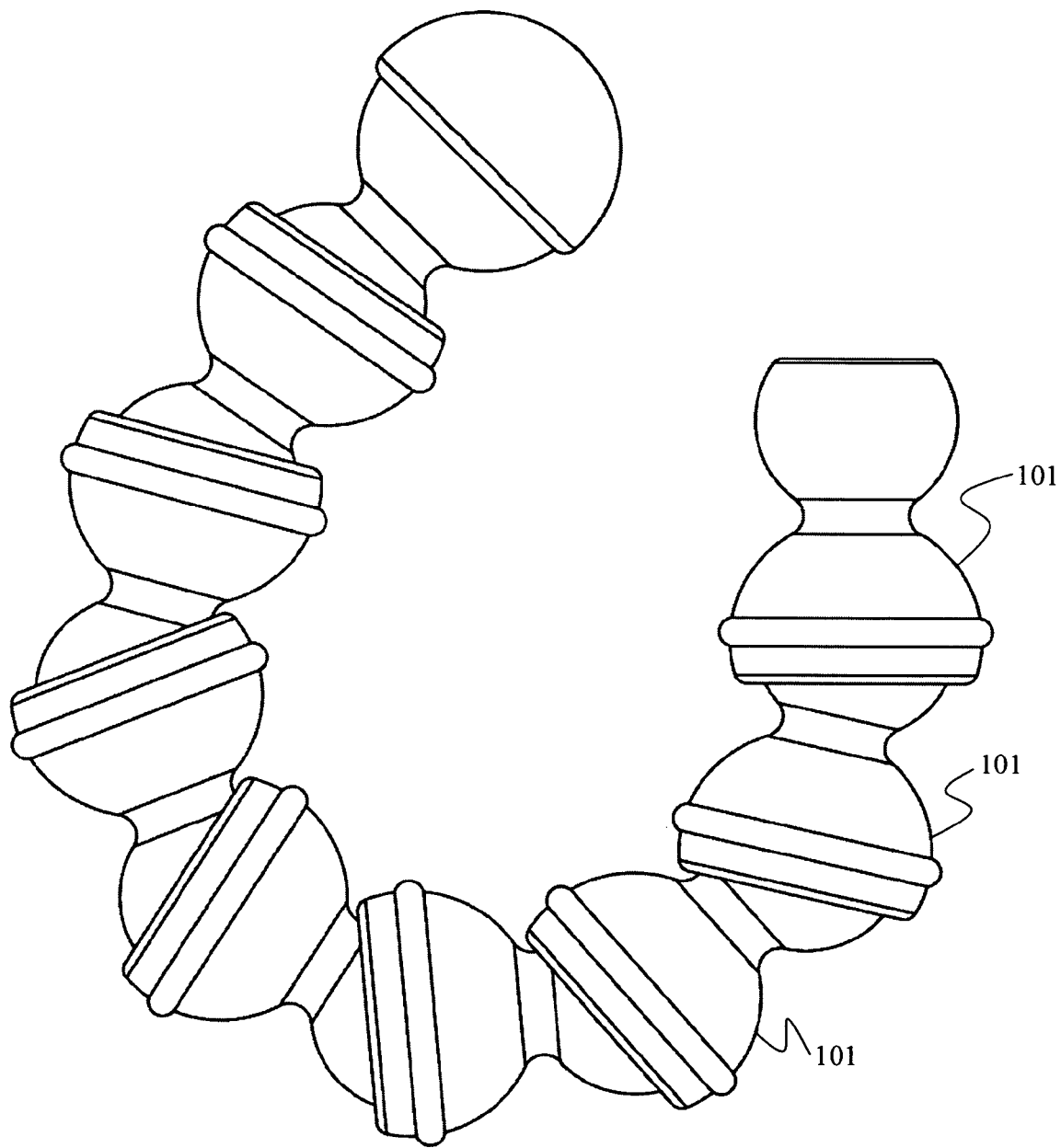
FIG. 31 illustrates a side view of a plurality of connected connectors according to some embodiments of the present invention.
Figure 32:
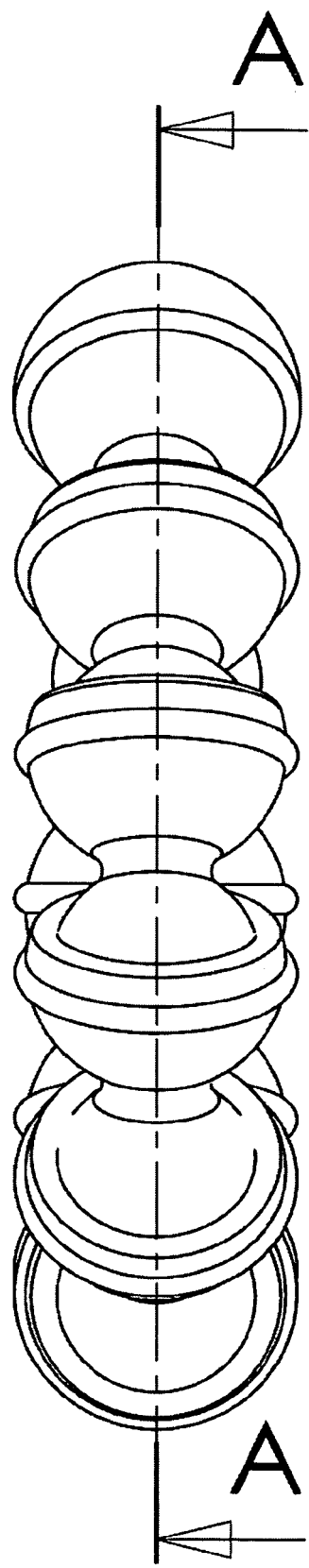
FIG. 32 illustrates an end view of a plurality of connected connectors according to some embodiments of the present invention.
Figure 33:
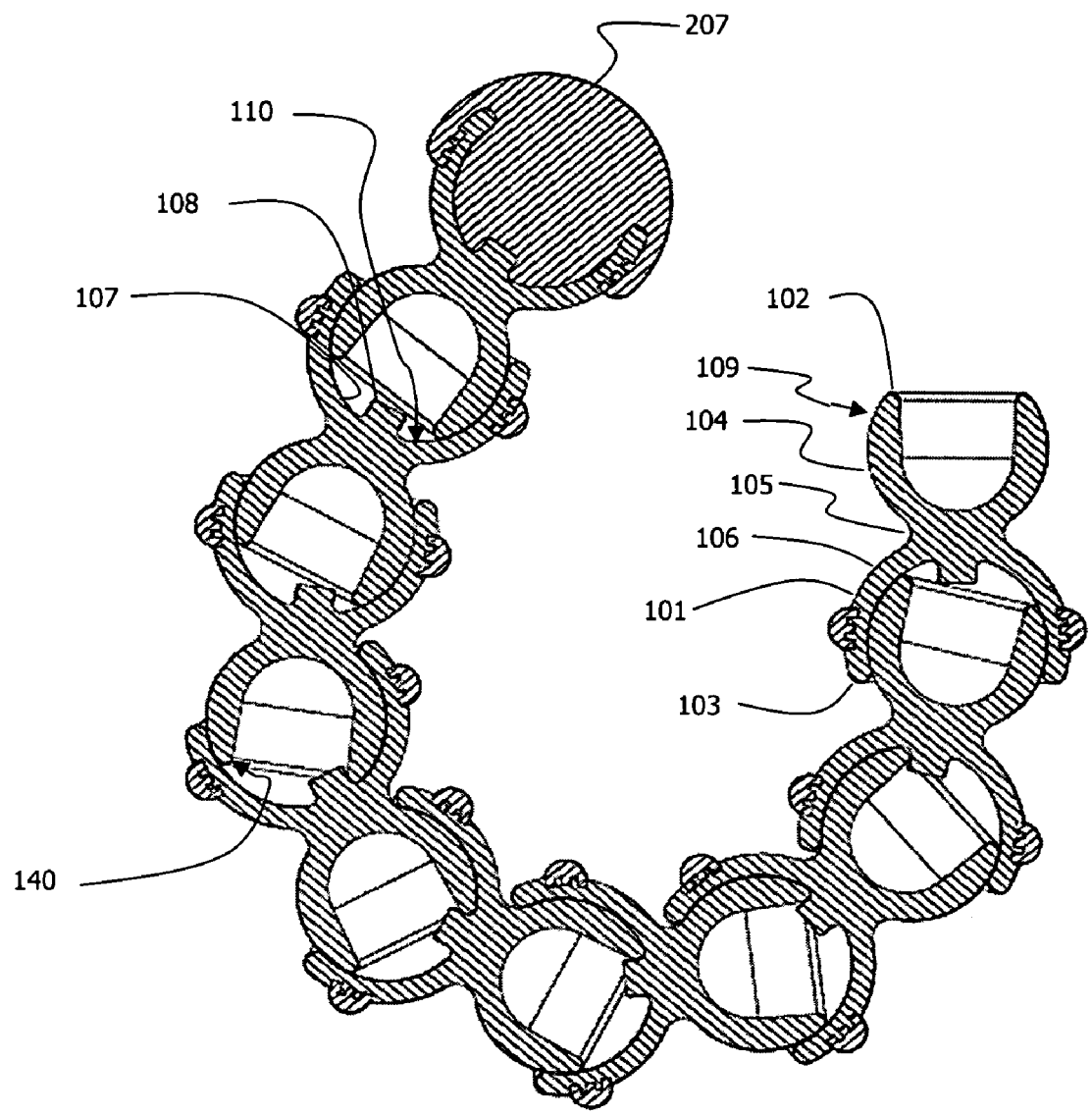
FIG. 33 is a cross-sectional view of a plurality of connected connectors according to some embodiments of the present invention.

FIGS. 31, 32, and 33 illustrate a plurality of ball and socket joint connectors 101 according to some embodiments of the present invention. A connector 101 has a first end portion 102 and a second end portion 103. A socket engaging end surface 104 is present at the first end 102. The first end portion 102 is substantially hollowed out.

The second end portion 103 has a body 106 with an internal socket receiving cavity 107. The inner surface 110 of the an internal socket receiving cavity 107 is adapted to fit over the socket engaging end surface 104 of another connector 101, or of another piece with a similar socket engaging end surface. A neckdown 105 separates the first end portion 102 from the second end portion 103. A stop nub 108 acts as a mechanical stop to prevent over angulation and possible unintentional separation of a ball and socket joint connector pair.

Figure 34:
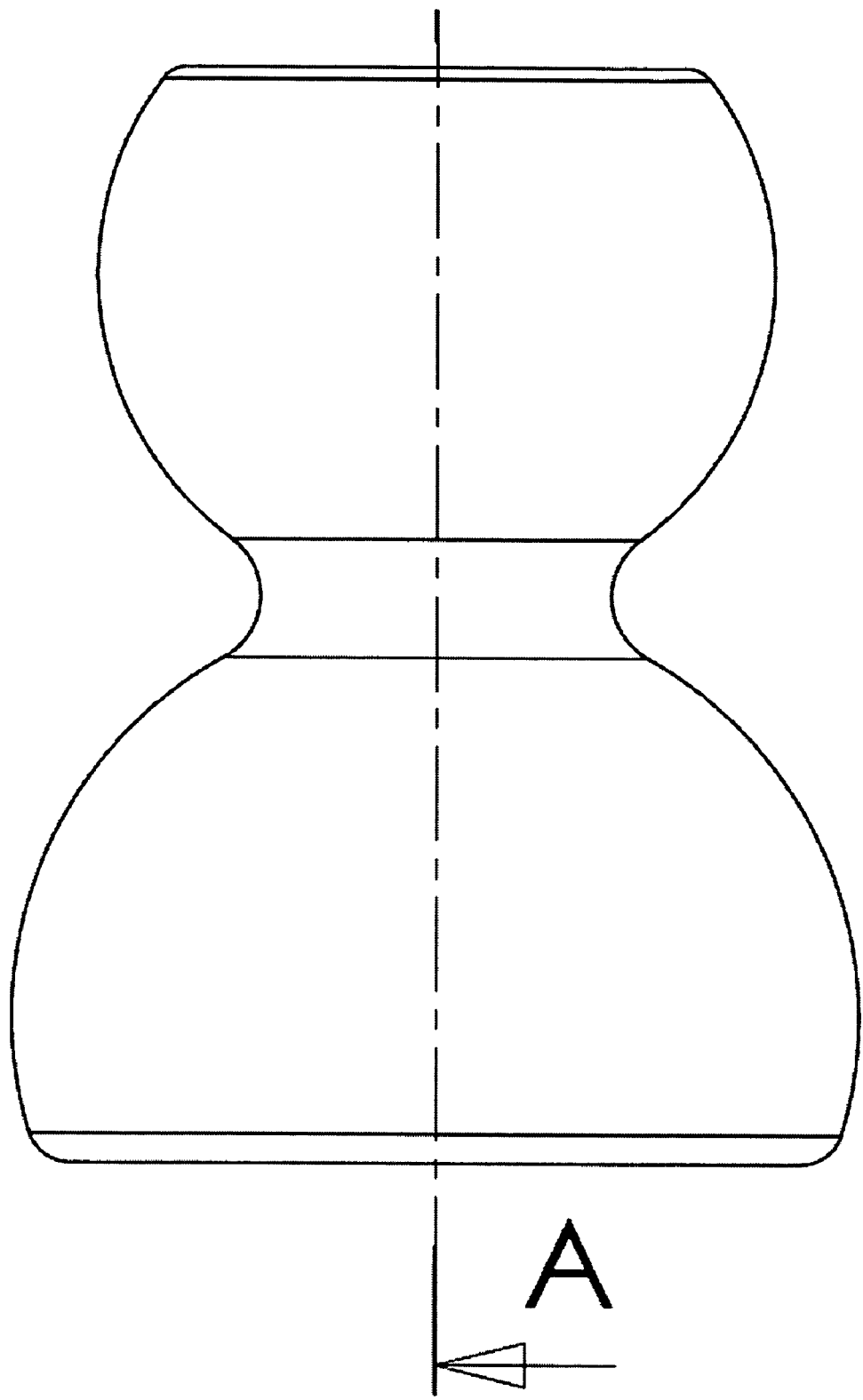
FIG. 34 is a side view of a connector according to some embodiments of the present invention.
Figure 35:
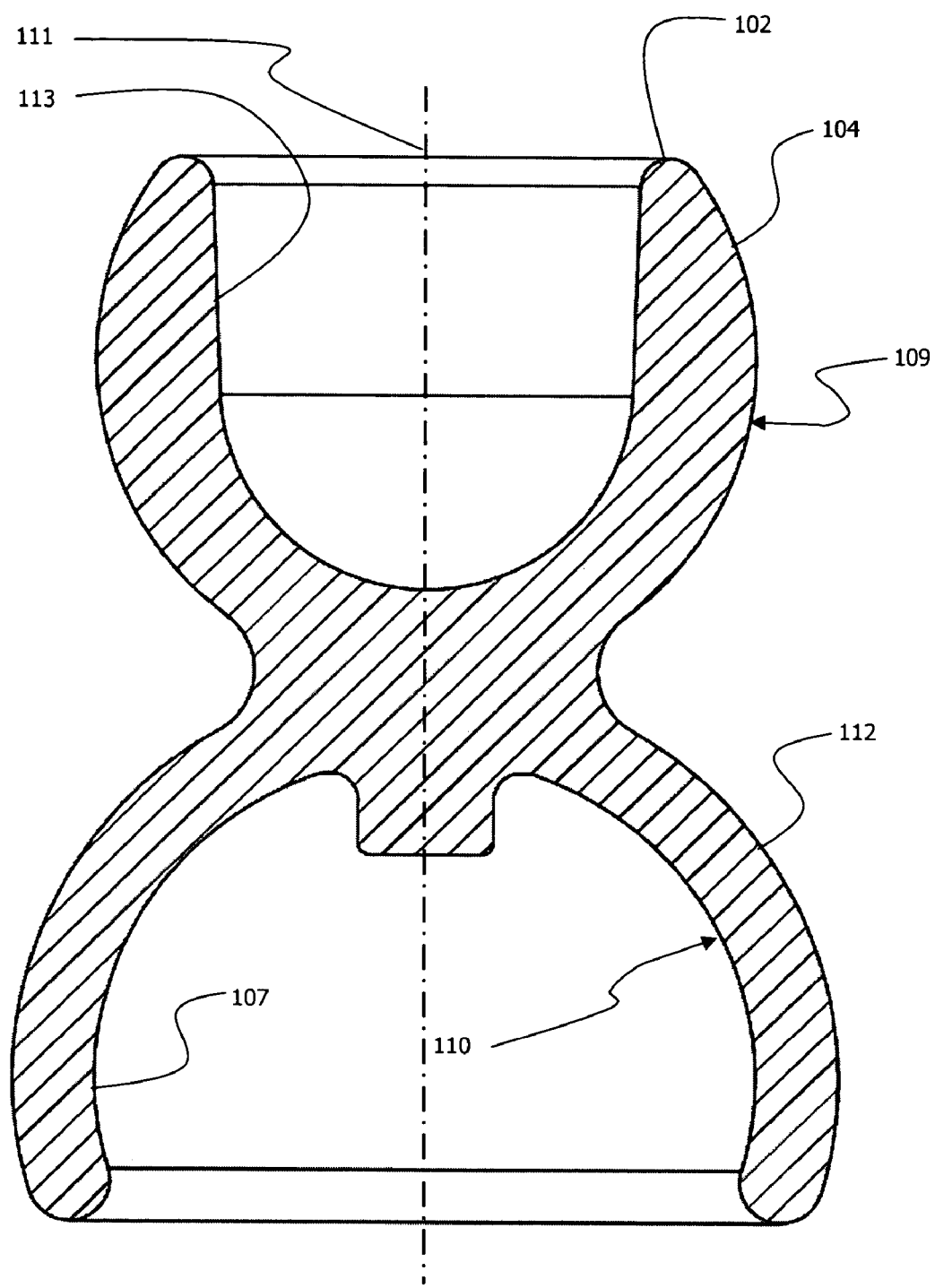
FIG. 35 is a cross-sectional view of a connector according to some embodiments of the present invention.

As seen in FIG. 34, the connector 101 has a primary axis 111 in some embodiments. The connector 101 may be symmetric around the primary axis 111 in some embodiments. The end surface planes of the first and second end portions of the connector may be perpendicular to the primary axis 111 in some embodiments.

In some embodiments of the present invention, the wall thicknesses of the internal socket receiving cavity or the socket engaging end surface, or both, are constructed so that an interference fit remains after the ball and socket joint connectors are connected. In some embodiments, the interference fit is designed such that the material is stressed to a stress level below that of the plastic limit but above the creep limit. The material may then creep until the interference is at or below the creep limit, typically down to the upper end of the elastic deformation stress range of the material. In such an embodiment using a plurality of connectors connected together to form a longer chain, the stresses will tend to equalize in the different connector pairs. This equalization of stresses will tend to equalize the frictions of the various connector pairs. An equalization of the frictions in the connector pairs in a long chain of connected connectors will tend to allow the chain of connectors to bend in a smooth fashion when the chain is subjected to bending forces. For example, in a 10 unit chain bent to a 45 degree angle, the bending may be well spread among the connector pairs.

Figure 36:
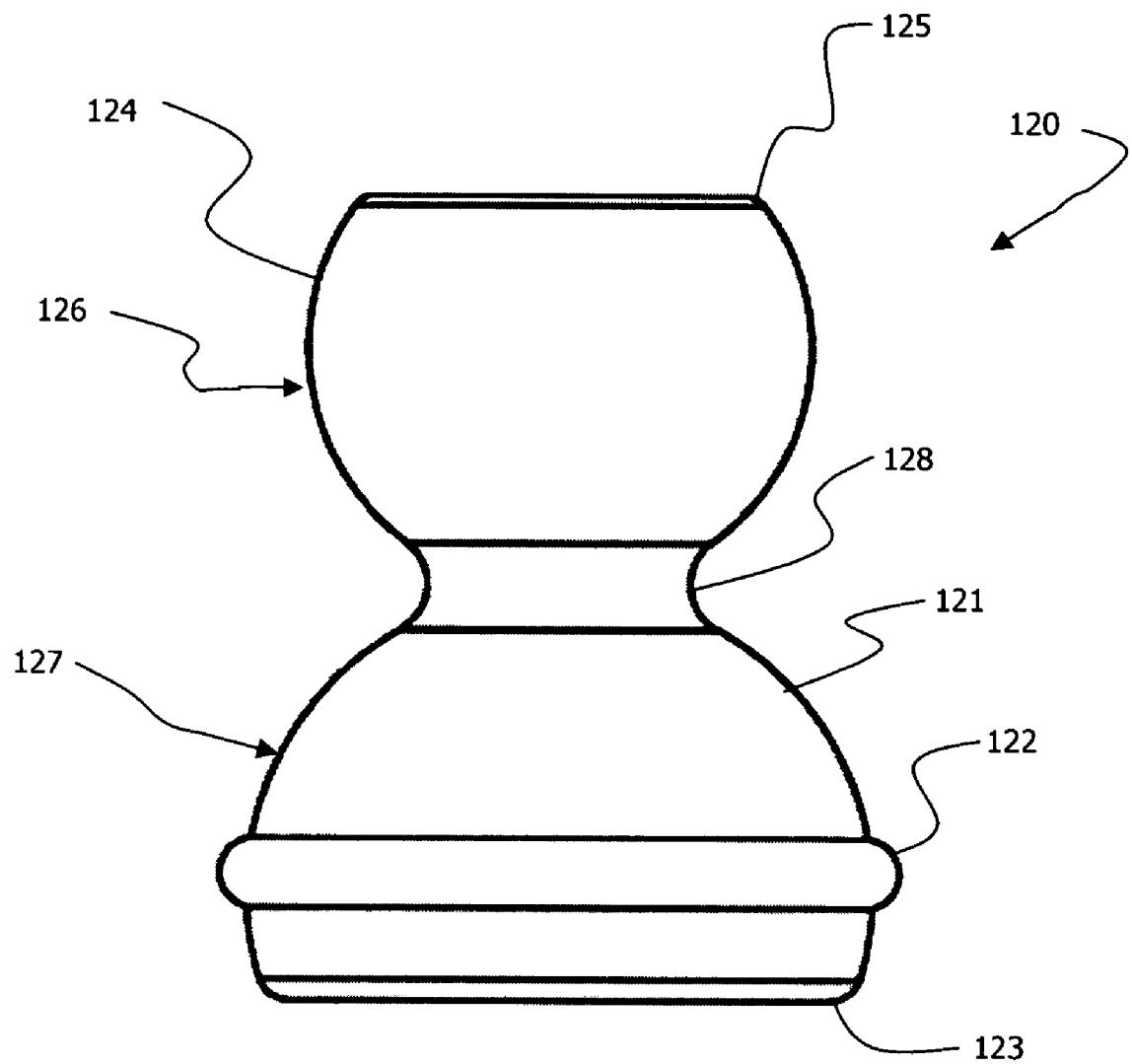
FIG. 36 is illustrates a connector with a gripping portion according to some embodiments of the present invention.
Figure 37:
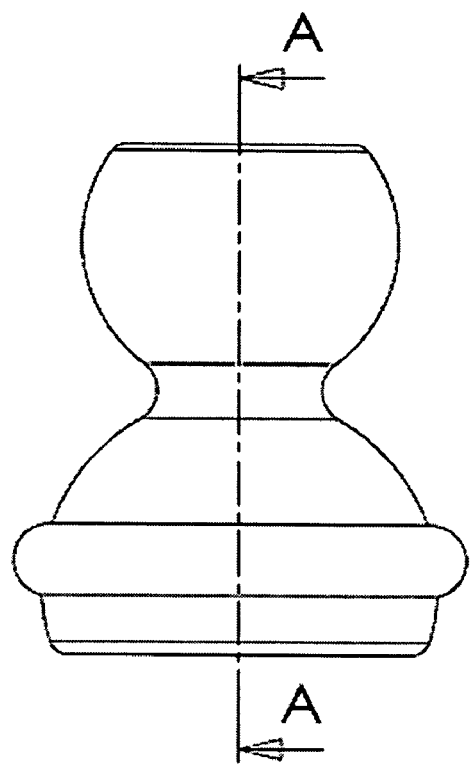
FIGS. 37 and 37A are a side and cross-sectional view of a connector with a gripping portion according to some embodiments of the present invention.
Figure 37A:
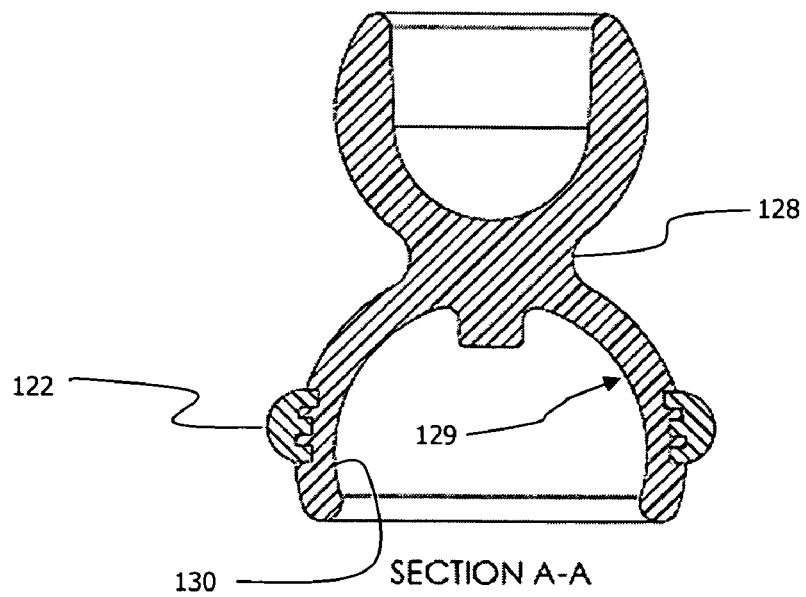

In some embodiments, as seen in FIGS. 36, 37 and 37A, a connector 120 includes a gripping portion 122. The connector 120 has a first end portion 125 and a second end portion 123. A socket engaging end surface 124 is present at the first end 125. The first end portion 125 is substantially hollowed out.

The second end 123 has a body 121 with an internal socket receiving cavity 130. The inner surface 129 of the an internal socket receiving cavity 130 is adapted to fit over the socket engaging end surface 124 of another connector, or of another piece with a similar socket engaging end surface. A neckdown 128 separates the first end portion 125 from the second end portion 123. A gripping portion 122 allows the connector to grip surfaces more readily. In some embodiments, the gripping portion is co-molded into the connector body. In some embodiments, the gripping portion is a rubberized compound. In some embodiments, the gripping portion is a circumferential ring molded into the outer surface of the connector. The gripping portion may provide a higher friction interface when the connector is set upon or wrapped around an object.

In some embodiments of the present invention, the outer surface 109 of the socket engaging end surface 104 may be lubricated. Lubrication of the outer surface 109 of the socket engaging end surface 104 may allow for more even frictions between various connections in a chain of connectors. In some embodiments, the inner surface 110 of the internal socket receiving cavity 107 may be lubricated. Lubrication of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated. In some embodiments, the surfaces may be coated with an adhesive. With some connector materials, such as acetyl materials, Delrin, and Nylon, compounds normally used as adhesive may function as a lubricant when used in an interference fit ball and socket joint connector.

In some embodiments of the present invention, the outer surface 109 of the socket engaging end surface 104 may be textured. The texture may take the form of a surface roughness. Texturing of the outer surface 109 of the socket engaging end surface 104 may allow for more even frictions between various connections in a chain of connectors. In some embodiments, the inner surface 110 of the internal socket receiving cavity 107 may be textured. The texture may take the form of a surface roughness. Texturing of the inner surface 110 of the internal socket receiving cavity 107 may allow for more even frictions. In some embodiments, both the outer surface 109 of the socket engaging end surface 104 and the inner surface 110 of the an internal socket receiving cavity 107 may be lubricated.

FIG. 33 illustrates a cross-sectional view of a plurality of ball and socket joint connectors. In some embodiments of the present invention, a stop nub 108 resides within the internal socket receiving cavity. The inner rim 140 of the socket engaging end surface 104 is adapted to contact the stop nub 108 as the two connectors reach a certain angle relative to each other. The contact of the stop nub 108 and the inner rim 140 of the socket engaging end surface 104 acts as a mechanical stop with regard to further angulation of the two pieces relative to each other. The mechanical stop function works to prevent over-rotation and possible disconnection of the two connectors.

Figure 38:
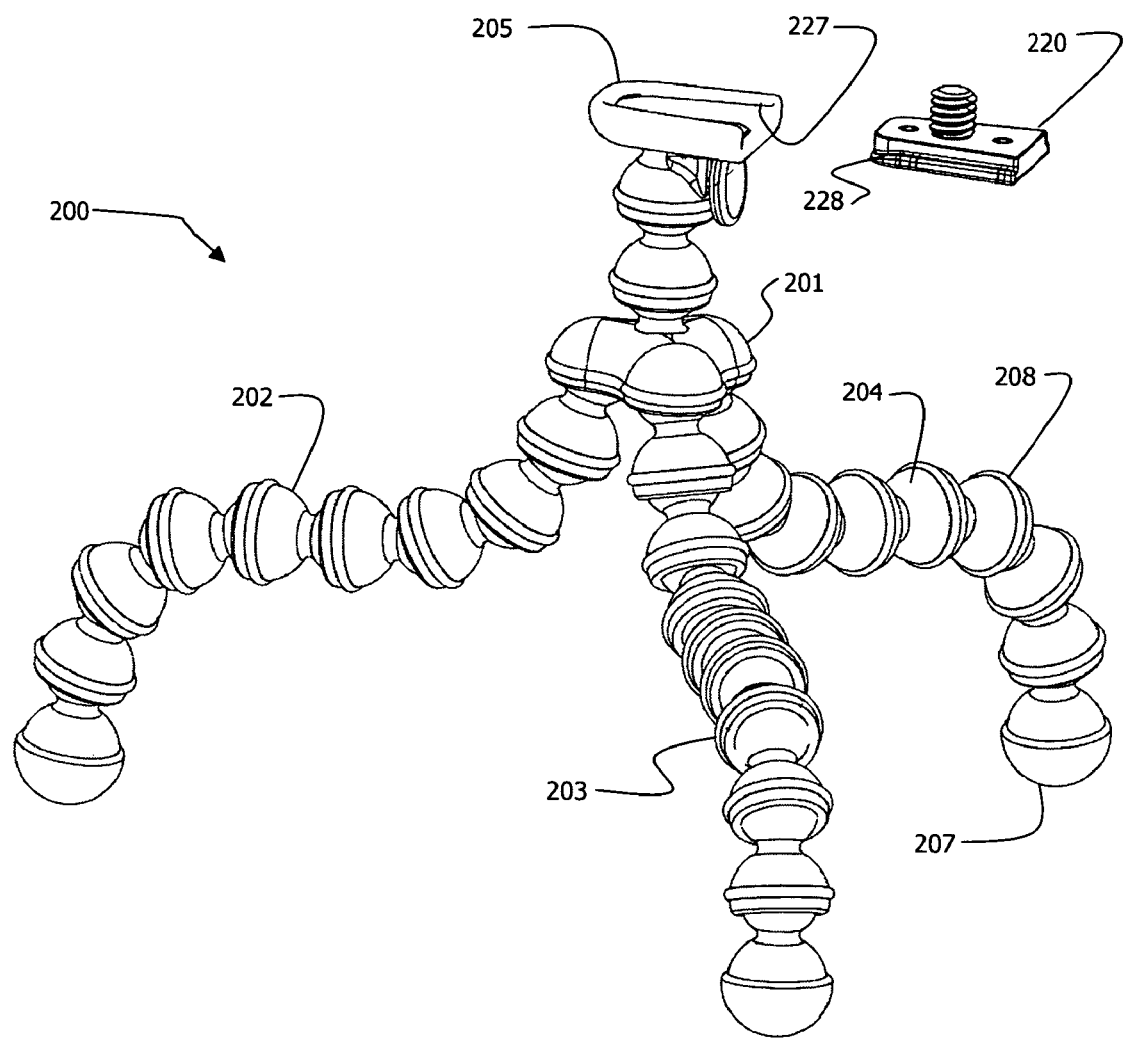
FIG. 38 is an illustration of a tripod apparatus according to some embodiments of the present invention.

FIG. 38 illustrates a tripod apparatus 200 according to some embodiments of the present invention. A body portion 201 provides a base of support for three flexible legs 202, 203, 204. The flexible legs 202, 203, 204 consist of a series of interconnected ball and socket joint connectors. The flexible legs are able to be flexed into a variety of positions and can be used to support the body portion 201 by forming tripod support. The flexible legs are able to adapt to uneven surfaces to allow the tripod to function in a variety of situations. Although three legs are used here for illustration, more legs may be present in some embodiments. As seen, the body portion 201 itself may have a series of interconnected ball and socket joint connectors within it, allowing for even more flexibility with regard to its mounting function.

Although the flexible legs are illustrated as functioning legs, the legs are of sufficient flexibility that the may be used to wrap around items such as bars or other objects in order to fasten the tripod apparatus to objects that would not be suitable for mounting of a typical tripod. In conjunction with the gripping portion, this allows the tripod apparatus to be fastened to a variety of objects. For example, when used to position a digital camera, the legs may wrap around a vertical gate rail, allowing the mounting of the camera for a photo taking opportunity not previously available.

In some embodiments, the body portion 201 is connected to an interconnect portion 205. A clip 220 is removably fastened to the interconnect portion 205. The clip 220 may have a threaded post adapted to fit into a camera or other device in some embodiments.

In some embodiments, the flexible legs 202, 203, 204 may use connectors that have a co-molded gripping portion 208. The gripping portions 208 may allow for use of the tripod in a variety of ways, including wrapping of the legs around a post or other object. In some embodiments, the flexible legs may be terminated with a gripping pod 207. As seen in cross-section in FIG. 3, the gripping pod 207 may be fully molded into the cavity of the connector. In some embodiments, the terminal connector of each leg has a socket engaging end surface on its first end and a suction cup on its second end. The suctions cups may allow for a secure attachment of the tripod apparatus 200 to a variety of surfaces.

Figure 39:
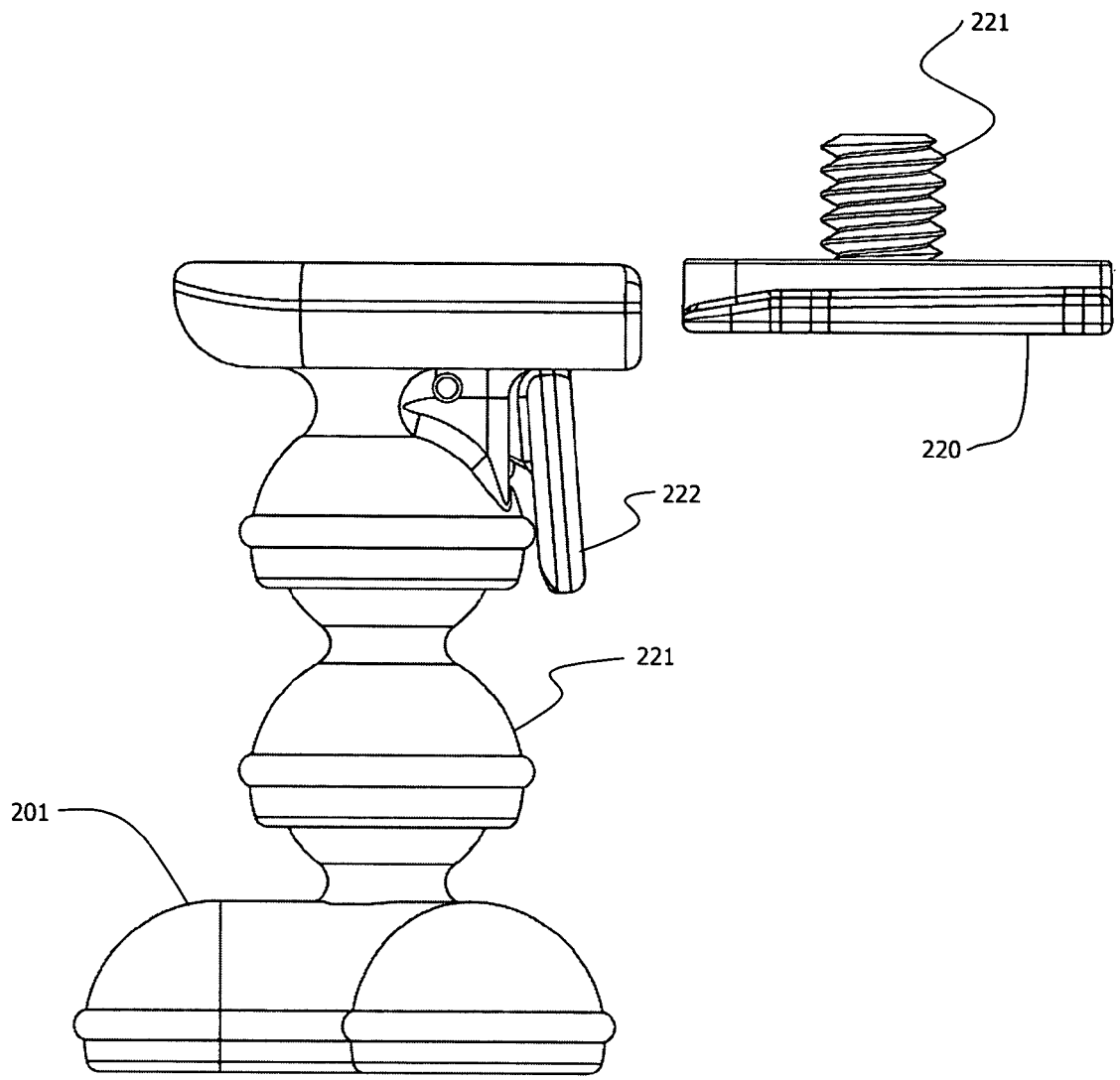
FIG. 39 is an illustration of a body and interconnect portion of a tripod apparatus according to some embodiments of the present invention.
Figure 40:
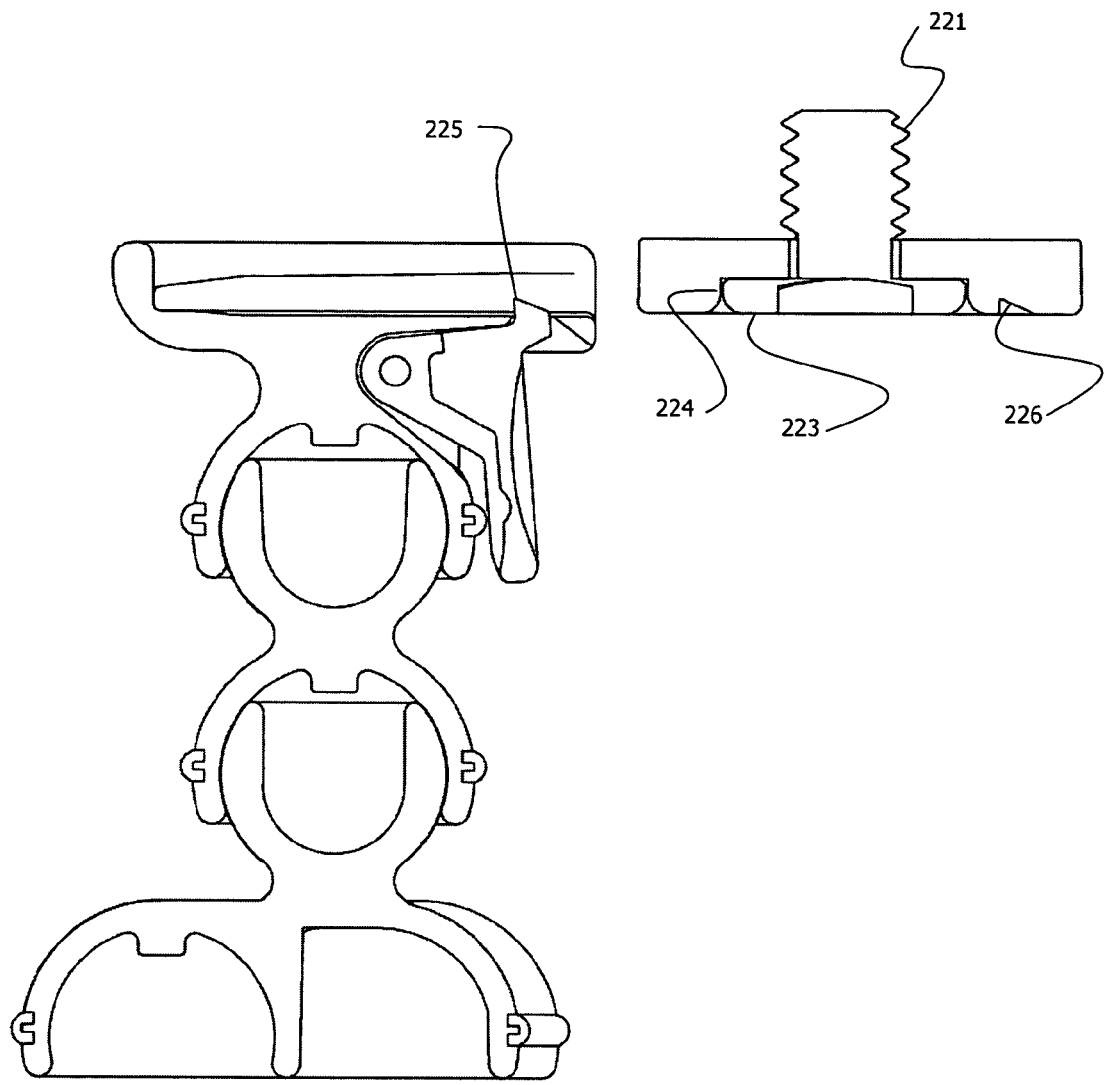
FIG. 40 is a cross-sectional view of a body and interconnect portion of a tripod apparatus according to some embodiments of the present invention.
Figure 41:
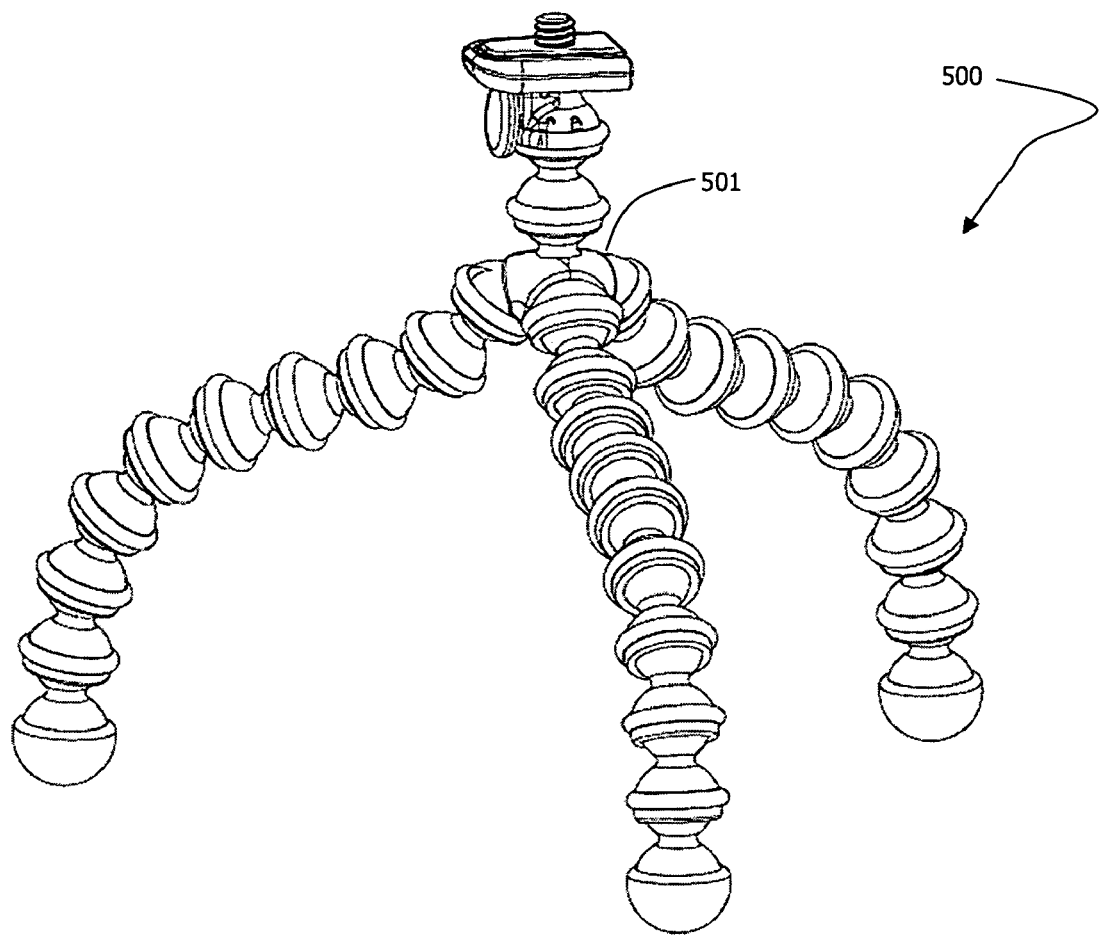
FIG. 41 is an illustration of a tripod apparatus according to some embodiments of the present invention.
Figure 42:
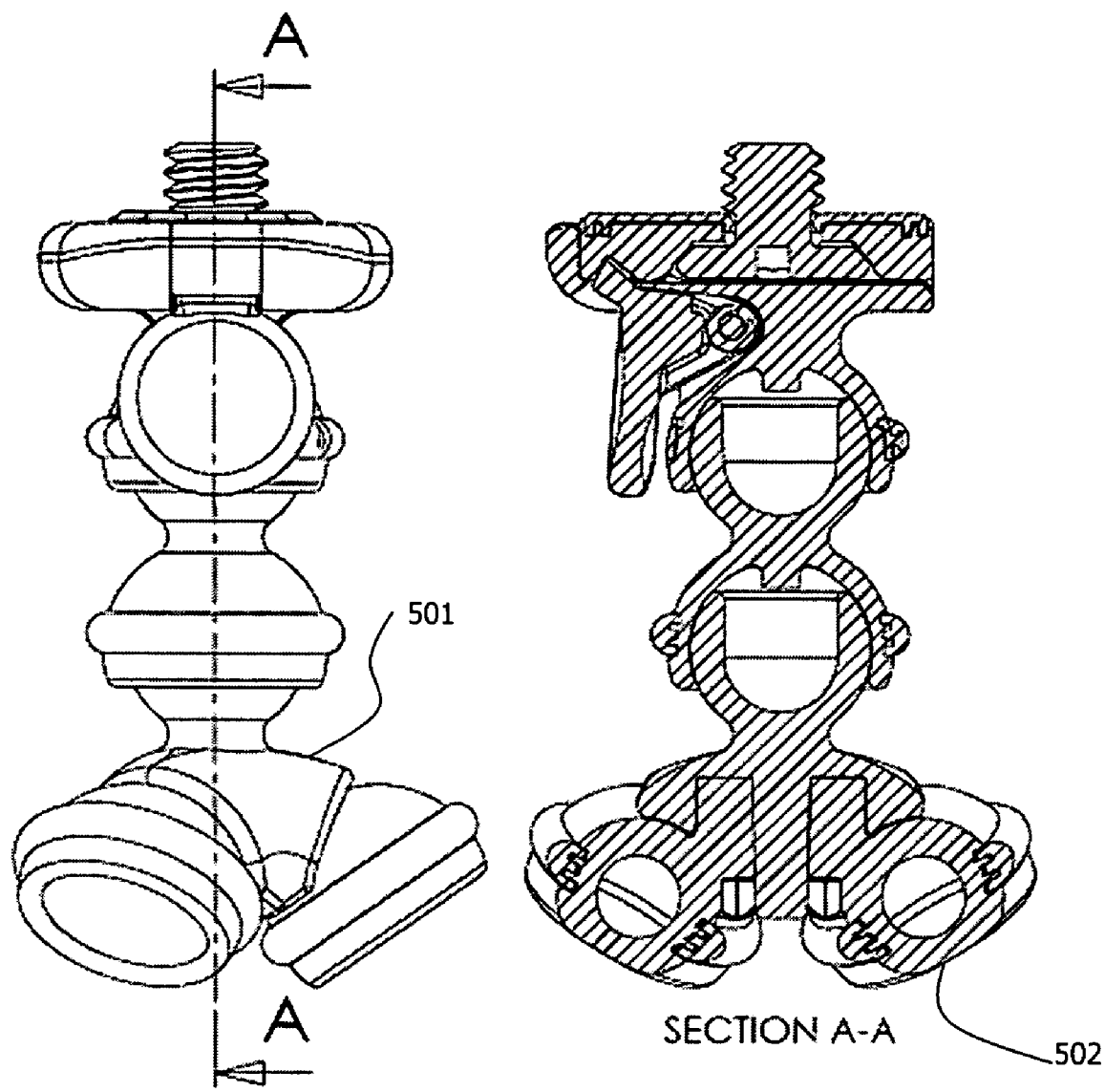
FIG. 42 is a side and cross-sectional view of a body and interconnect portion of a tripod apparatus according to some embodiments of the present invention.
Figure 43:
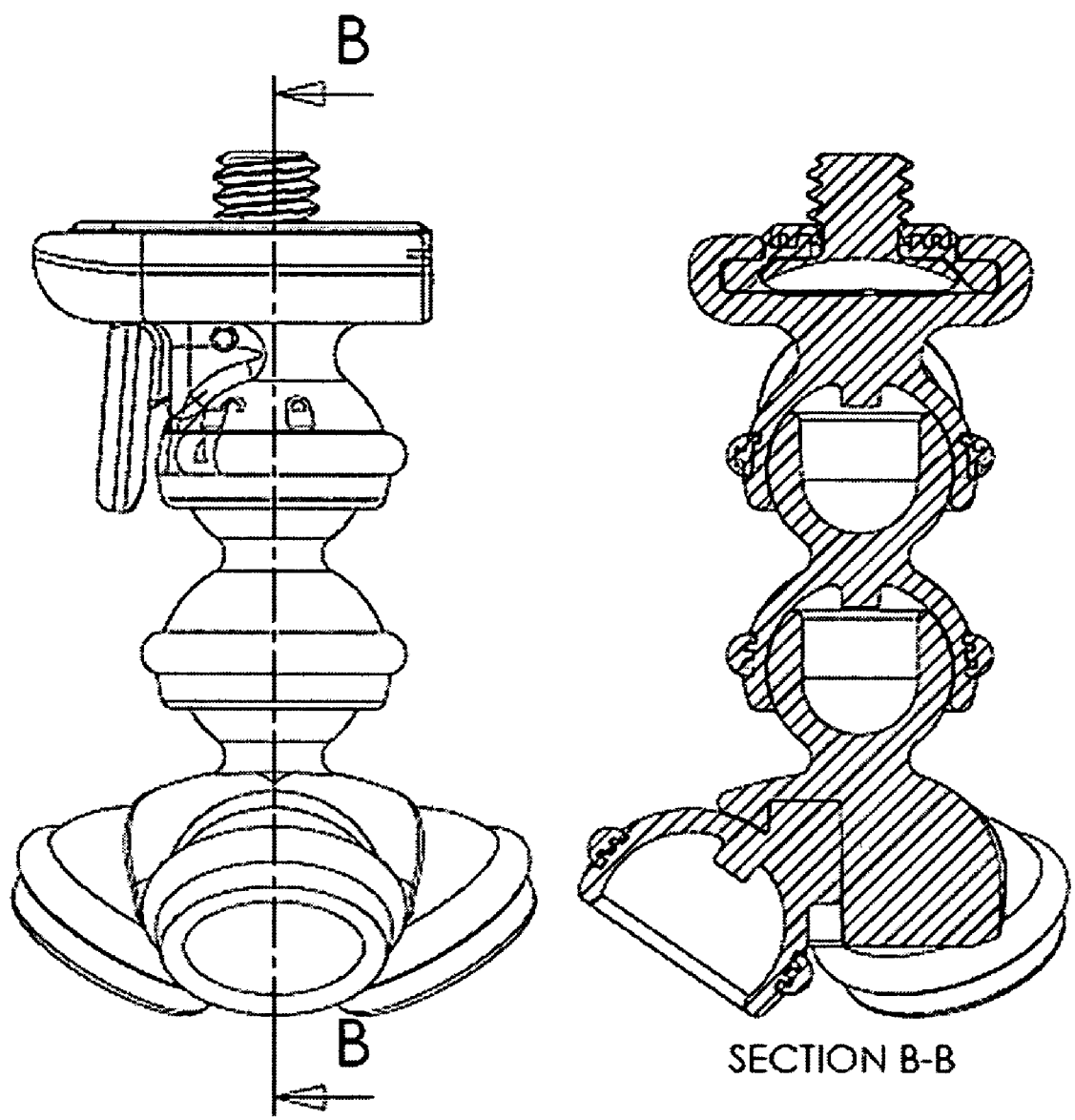
FIG. 43 is a side and cross-sectional view of a body and interconnect portion of a tripod apparatus according to some embodiments of the present invention.
Figure 44:
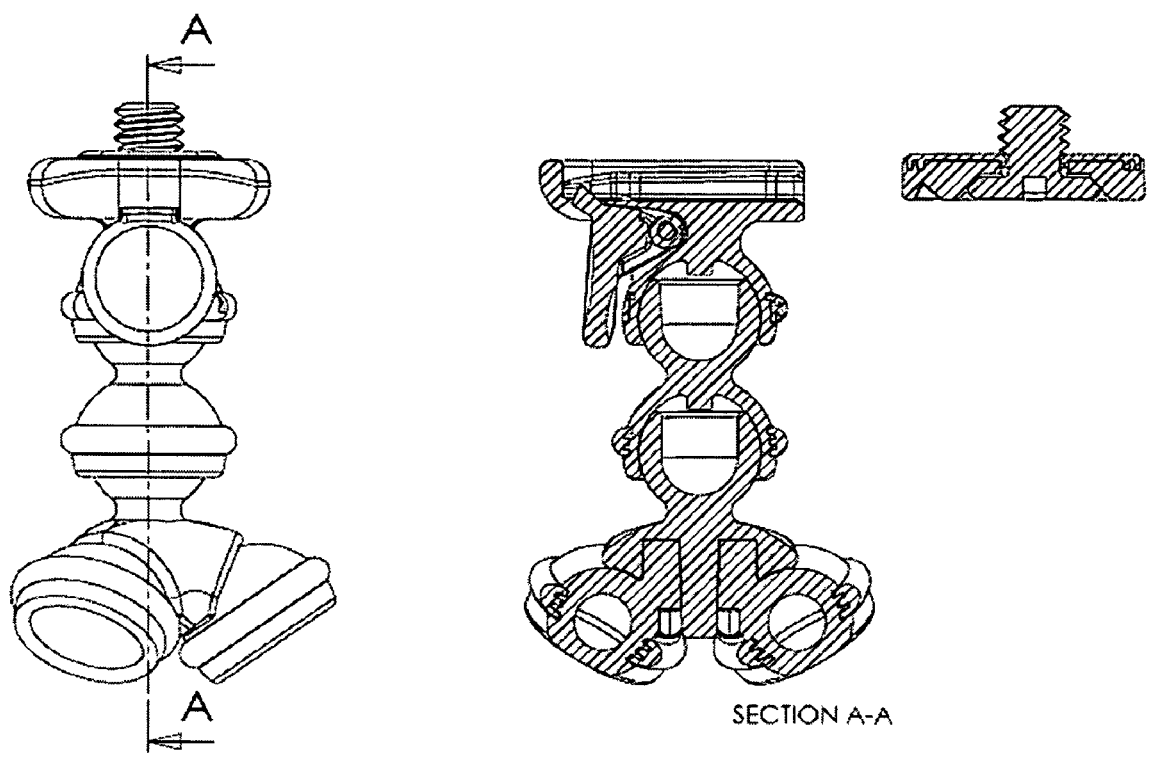
FIG. 44 is a side and cross-sectional view of a body and interconnect portion of a tripod apparatus according to some embodiments of the present invention.

In some embodiments of the present invention, as further illustrated in FIGS. 39, 40 and 41, the interconnect portion 205 is adapted to receive a clip 220. The clip 220 may have rails 228 adapted to slide into slots 227 within the interconnect portion 205. The clip 220 may have recess 226 adapted to be filled by a tab 225 on a spring loaded lever 222. The clip is removably attached to the interconnect portion 205 and may be released by pressing on the lever 222. In some embodiments, the lever 222 is on the same side of the interconnect portion 205 as which the clip 220 slides in on. In other embodiments, the lever 222 is on the side opposite that which the clip 220 slides in on.

A mounting screw 221 may be recess mounted into the clip 220 in some embodiments. The screw 223 may be of the standard size and thread to attach to a camera in some embodiments. The head 223 of the screw 221 may be held into the recess 224 by a slight ridge in the molding of the recess in some embodiments.

In some embodiments of the present invention, as seen in FIGS. 20, 21, 22, and 23, a tripod apparatus 500 utilizes a body portion 501 which spaces and locates the legs of the apparatus in a different configuration. The spacing of the body sockets 502 allows for better use of the tripod legs as attaching arms in some uses. In some embodiments, the body sockets 502 are equally spaced around the center of the body portion 501. The body sockets are also flared at an angle relative to the ground (in typical usage). In some embodiments, the flared angle is 45 degrees. The flaring of the body sockets allows a different range of potential wrapping angles for the legs of the tripod.

With the flaring of the body sockets, the tripod legs may still be utilized as in the case of a typical tripod. The range of motion of the body sockets and the connectors which form the legs still allow for vertical positioning of the legs. Thus, the body portion 501 retains the tripod's usual functionality. The flaring, however, allows for greater bending of the legs in cases where the legs are used as gripping arms, such as when wrapped around vertical bars and the like. Thus the body portion 501 adds to the range of positions and to the types of uses that the apparatus may entertain.

Figure 45:
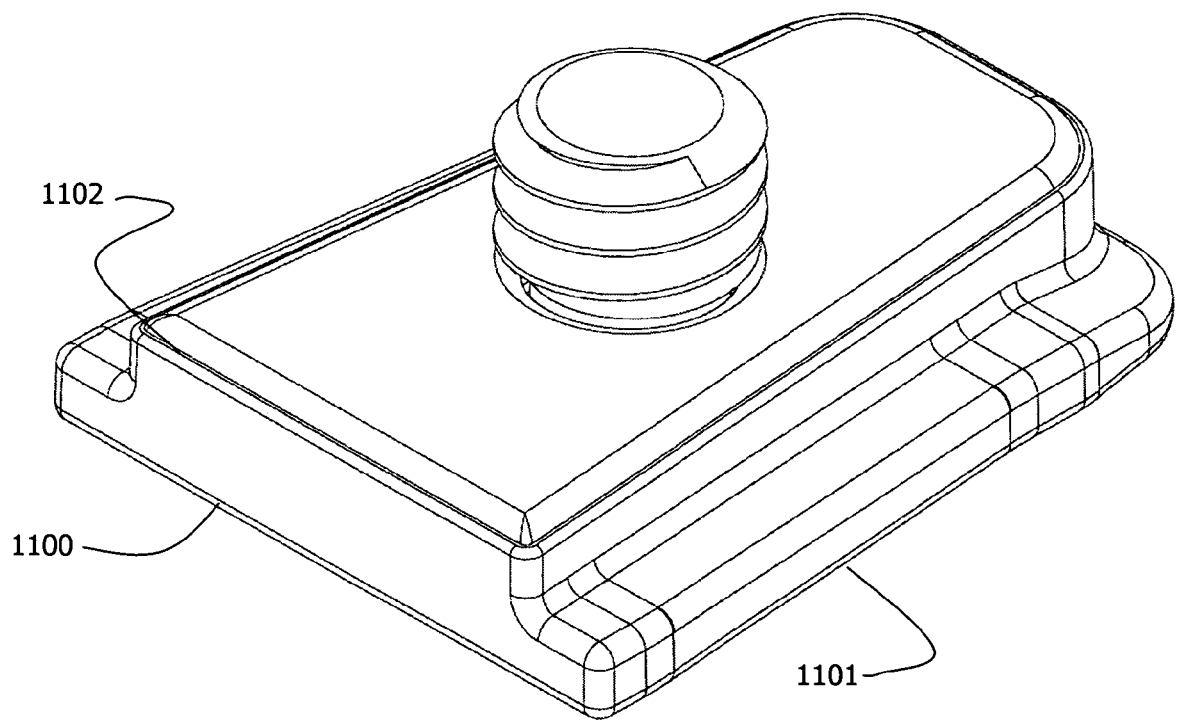
FIG. 45 is a top perspective view of a clip according to some embodiments of the present invention.
Figure 46:
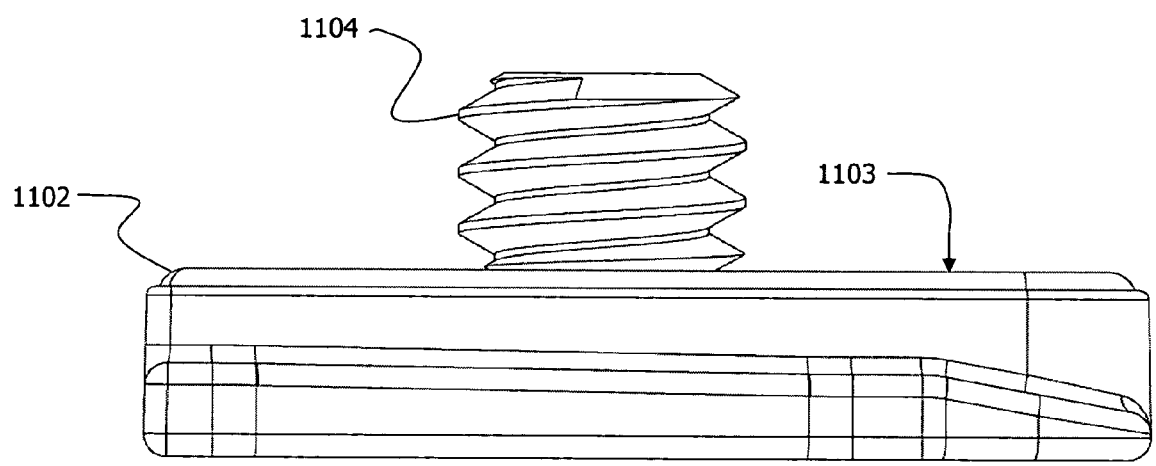
FIG. 46 is a side view of a clip according to some embodiments of the present invention.

FIGS. 45 and 46 illustrate a clip according to some embodiments of the present invention. A clip 1100 is shown with a main body 1101 and a grip surface 1102. The clip 1100 is adapted to attach to a support structure such as a tripod. The clip 1100 may have a substantially flat bottom surface with a recess therein. The recess may be adapted to be filled by a tab which is adapted to be filled by a tab on a spring loaded lever.

When the clip is attached to an electronic device such as a camera, the threaded portion 1104 is threaded up into the device. This is done when the clip is not attached to the support structure, and allows for the clip to be attached to camera, or other device, just once, and from then on the clip may be clipped to the support structure without requiring repetitive threading into the device. The clip is small enough that it may be stored with the camera.

In some cases, there may be concern that the camera may rotate relative to the clip 1100 even after tightening of the threads up in to the camera. A grip surface 1102 allows for a grabbier surface 1103 to be in contact with the device or camera. The grip surface 1102 may be overmolded onto the main body 1101 in some embodiments. The grip surface 1102 may compress somewhat when the camera is threaded on to the clip. The grip surface may greatly reduce the likelihood of rotary movement of the camera relative to the clip.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

We claim:

1. A clip comprising:
   a clip base, said clip base adapted to be clipped into a mating structure; wherein said clip base comprises:
   a top and a bottom opposite to one another;
   a first, second, third, and fourth side around the perimeter of said clip base,
   wherein said first and third sides are opposing, and wherein said second and fourth sides are opposing;
   a first rail along said first side of said clip base, said first rail protruding outward from said clip base; and
   a third rail along said third side of said clip base, said third rail protruding outward from said clip base;
   a bottom floor, said bottom floor extending between said first, second, third, and fourth sides of said clip base;
   a top slot in said top of said clip base, said slot adapted to receive the mounting portion of a flash unit; and
   a first neckdown portion along said first and said third rails, wherein said bottom of said clip base comprises a substantially flat bottom surface, and wherein the bottom surface of said clip base comprises a slot.

2. The clip of claim 1 wherein the distance between said first rail and said third rail along said first neckdown portion lessens along a direction from said second side of said plate to said fourth side of said plate.

3. The clip of claim 2 further comprising a second neckdown portion.

4. The clip of claim 3 wherein the distance between said first rail and said third rail along said second neckdown portion lessens along a direction from said second side of said plate to said fourth side of said plate.

5. The clip of claim 4 wherein said first neckdown portion narrows in width at a first angle.

6. The clip of claim 5 wherein said second neckdown portion narrows in width at a second angle.

7. The clip of claim 6 wherein said first neckdown portion narrows in width more steeply than said second neckdown portion.

8. The clip of claim 7 wherein the thickness of said first rail and said third rail lessens along a direction from said second side of said plate to said fourth side of said plate.

9. The clip of claim 7 wherein the thickness of said first rail and said third rail lessens at a first rate along said first neckdown portion, and wherein the thickness of said first rail and said third rail lessens at a second rate along said second neckdown portion.

10. The clip of claim 6 wherein said clip further comprises an intermediate portion, said intermediate portion located between said first neckdown portion and said second neckdown portion.

11. The clip of claim 10 wherein said plate does not narrow in width in said intermediate portion.

12. The clip of claim 1 wherein the thickness of said first rail and said third rail lessens along a direction from said second side of said plate to said fourth side of said plate.

* * * * *